(12) United States Patent
Harper et al.

(10) Patent No.: US 12,198,025 B2
(45) Date of Patent: Jan. 14, 2025

(54) OVERCOMING DATA MISSINGNESS FOR IMPROVING PREDICTIONS

(71) Applicant: Janssen Research & Development, LLC, Raritan, NJ (US)

(72) Inventors: Jennifer Seto Harper, Hillsborough, NJ (US); Rajarshi Roychowdhury, Monmouth Junction, NJ (US); Smita Mitra, Skillman, NJ (US); Jeffrey John Headd, North Wales, PA (US)

(73) Assignee: JANSSEN RESEARCH & DEVELOPMENT, LLC, Raritan, NJ (US)

( * ) Notice: Subject to any disclaimer, the term of this patent is extended or adjusted under 35 U.S.C. 154(b) by 0 days.

(21) Appl. No.: 17/877,836

(22) Filed: Jul. 29, 2022

(65) Prior Publication Data

US 2023/0044574 A1    Feb. 9, 2023

Related U.S. Application Data

(60) Provisional application No. 63/226,878, filed on Jul. 29, 2021.

(51) Int. Cl.
*G06N 20/00* (2019.01)
*G06F 18/211* (2023.01)
*G06F 18/22* (2023.01)

(52) U.S. Cl.
CPC ........... *G06N 20/00* (2019.01); *G06F 18/211* (2023.01); *G06F 18/22* (2023.01)

(58) Field of Classification Search
CPC ........ G06N 20/00; G06F 18/22; G06F 18/211
See application file for complete search history.

(56) References Cited

U.S. PATENT DOCUMENTS

2021/0166308 A1* 6/2021 Carmichael ............ G06Q 40/02

OTHER PUBLICATIONS

Rahman, M., et al, Machine Learning Based Missing Value Imputation Method for Clinical Datasets, Received from Internet:<https://link.springer.com/chapter/10.1007/978-94-007-6190-2_19> (Year: 2013).*

(Continued)

*Primary Examiner* — Miranda M Huang
*Assistant Examiner* — Bart I Rylander
(74) *Attorney, Agent, or Firm* — Maschoff Brennan; Andrew A. Noble

(57) ABSTRACT

Disclosed herein are methods for training and deploying a predictive model for generating a prediction, e.g., patient eligibility for a CAR-T therapy. Datasets, such as open healthcare claims datasets, may be missing data. Missing data may hamper the ability to generate sufficient information needed for training a predictive model. Methods include leveraging comprehensive datasets, such as closed claims datasets, to create training examples for input into a machine learning algorithm. In various embodiments, the comprehensive dataset is modified to simulate the data missingness in the target dataset; then, the modified dataset is paired with the ground truth label derived from the comprehensive dataset to create training examples. In various embodiments, a comprehensive dataset is paired with a target dataset to create training examples. After training a predictive model on such examples, the model can be deployed to make predictions in the target dataset even in light of missing data.

30 Claims, 14 Drawing Sheets

(56) References Cited

OTHER PUBLICATIONS

Alamir, E., et al, Motor Insurance Claim Status Prediction using Machine Learning Techniques, Received from internet:<https://www.proquest.com/openview/3ba89223b1e4ce09f572b38b210a95c8/1?pq-origsite=gscholar&cbl=5444811> (Year: 2021).*

Sivakani, R., et al, Imputation Using Machine Learning Techniques, Received from Internet:<https://ieeexplore.ieee.org/abstract/document/9315205> (Year: 2020).*

An, S., et al, Predicting drug-resistant epilepsy—A machine learning approach based on administrative claims data, Received from Internet:<https://www.sciencedirect.com/science/article/pii/S1525505018305912> (Year: 2018).*

Garcia-Laencina, P., et al, Missing data imputation on the 5-year survival prediction of breast cancer patients with unknown discrete values, Received from Internet:<https://www.sciencedirect.com/science/article/pii/S0010482515000554> (Year: 2015).*

Jacob, C., et al, Assessing asthma severity based on claims data: a systematic review, Received from Internet:<https://link.springer.com/article/10.1007/s10198-016-0769-2> (Year: 2016).*

Kittai, A., et al, Comorbidities Predict Inferior Survival in Patients Receiving CAR T-Cell Therapy for Relapsed/Refractory DLBCL: A Multicenter Retrospective Analysis, Received from Internet:<https://www.sciencedirect.com/science/article/pii/S0006497118586973> (Year: 2019).*

Liu, T., et al, A hybrid machine learning approach to cerebral stroke prediction based on imbalanced medical dataset, Received from internet:<https://www.sciencedirect.com/science/article/pii/S0933365719302295> (Year: 2019).*

Melfi, C., et al, Selecting a Patient Characteristics Index for the Prediction of Medical Outcomes Using Administrative Claims Data, Received from Internet:<https://www.sciencedirect.com/science/article/pii/0895435694002022> (Year: 1995).*

Nguyen, T., Predicting Cardiovascular Risks using Pattern Recognition and Data Mining, Received from Internet:<https://ethos.bl.uk/OrderDetails.do?uin=uk.bl.ethos.523800> (Year: 2009).*

Qin, J., et al, A Machine Learning Methodology for Diagnosing Chronic Kidney Disease, Received from Internet:<https://ieeexplore.ieee.org/abstract/document/8945312> (Year: 2019).*

Diaz-Garcia, J., et al, Downsampling Methods for Medical Datasets, Retrieved from Internet:<https://upcommons.upc.edu/handle/2117/111411> (Year: 2017).*

Chang, Y., et al, Neural Network Training with Highly Incomplete Datasets, Retrieved from Internet:<https://pesquisa.bvsalud.org/global-literature-on-novel-coronavirus-2019-ncov/resource/ru/ppzbmed-2107.00429v1> (Year: 2021).*

Rayhan, F., et al, CUSBoost: Cluster-based Under-sampling with Boosting for Imbalanced Classification, Retrieved from Internet:<https://ieeexplore.ieee.org/abstract/document/8447534> (Year: 2017).*

Enblad et al., "CAR T-Cell Therapy: The Role of Physical Barriers and Immunosuppression in Lymphoma," Human Gene Therapy, 2015, vol. 26, No. 8, pp. 498-505.

Holliger et al., "Engineered antibody fragments and the rise of single domains," Nature Biotechnology, 2005, vol. 23, No. 9, pp. 1126-1136.

* cited by examiner

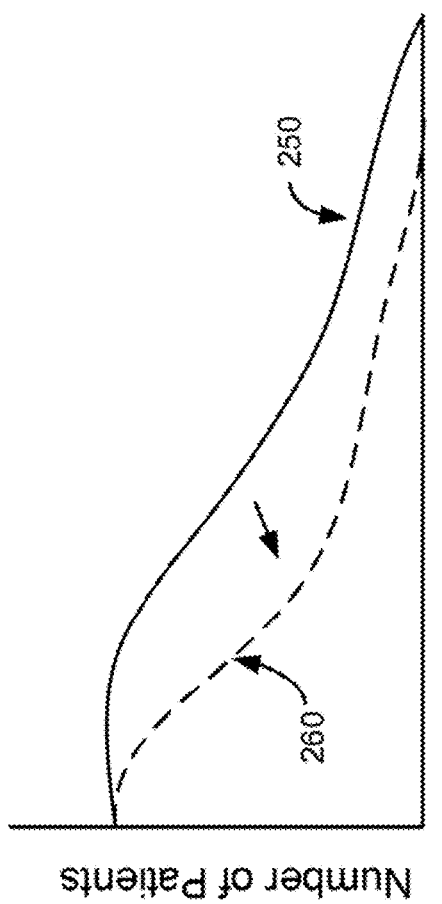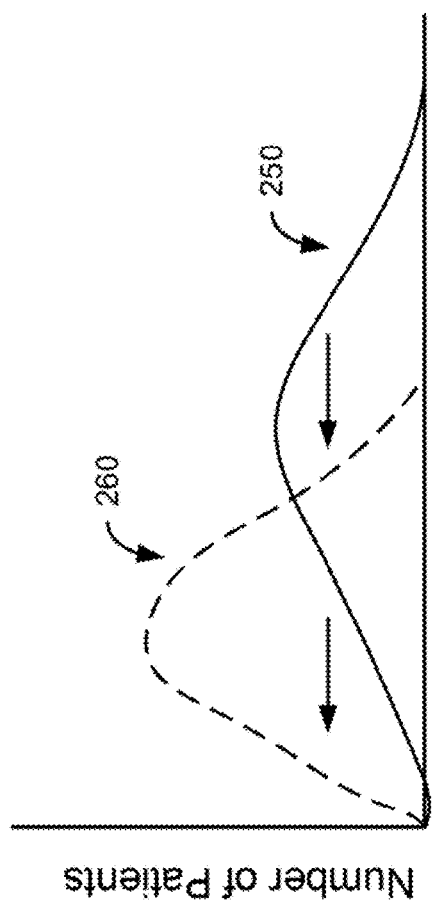

|  | Feature 1 | Feature 2 | Feature 3 |
|---|---|---|---|
| Patient 1 | Datapoint 1.1 | Datapoint 1.2 | Datapoint 1.3 |
| Patient 2 | Datapoint 2.1 | Datapoint 2.2 | Datapoint 2.3 |
| Patient 3 | Datapoint 3.1 | Datapoint 3.2 | Datapoint 3.3 |

FIG. 2D

| Closed; generally complete data 502 | Open; generally missing data 504 |
|---|---|
| Closed Datasets (e.g., IBM MarketScan Commercial Claims and Encounters Database, Optum Clinformatics Data Mart) | Open Datasets (e.g., Symphony Health Solutions Integrated Dataverse, IQVIA Longitudinal Access and Adjudicated Data) |
| • Sourced from insurance plans, payers | • Sourced from points of transactions, e.g. doctor's offices, pharmacies, clearinghouses |
| • Contains claims data during patient's period of enrollment | • Contains data only from "in network" sources |
| • Does not contain data outside of enrollment period or when patient does not use insurance | • Market capture can vary per product |
| | • Drug manufacturers can block data capture for their products |
| • Typically smaller market capture / smaller cohorts | • Typically larger market capture / larger cohorts |

FIG. 5

Scenarios for training ML model

| No | Target dataset for deploying model | Source for ground truth | Source for predictive features | Source of patients within linked data | Figure |
|---|---|---|---|---|---|
| 1 | Open | Closed | Modified Closed (data points selectively removed to simulate missing data in open claims) | N/A (datasets are not linked in this scenario) | Fig. 2A |
| 2 | Open | Closed half of linked data | Open half of linked data | Patients must have data in both halves of the linked dataset | Fig. 2E |
| 3 | Linked dataset | Superset (union of closed and open data) | Superset | Patients must have data in the closed half (it is OK if some patients have no data in the open half) | Fig. 9 |
| 4 | Open | Superset | Open half of linked data | Patients must have data in both halves of the linked dataset | Fig. 9 |

FIG. 10

OVERCOMING DATA MISSINGNESS FOR IMPROVING PREDICTIONS

BACKGROUND

Predictive models have long been used for generating health-based predictions. In the modern era, increasingly sophisticated machine learning models have been designed to process and gain clinical insights from large patient datasets and increase the accuracy of health-based predictions. Further, modern data collection methods have allowed insurance companies, doctors' offices, pharmacies, and other providers to vastly increase the amount and quality of patient datasets that can be adapted for use in training and deploying health-based predictive models.

Generally, comprehensive histories of subjects are helpful for generating accurate health-based predictions for the subjects. However, not all available patient datasets will have the comprehensive patient history that can be informative for generating health-based predictions for patients.

SUMMARY

There may be significant portions of data missing from certain datasets. While a closed healthcare dataset (also referred to herein as a "closed dataset" or a "closed claims dataset") compiled by an insurance provider may comprise comprehensive patient history data, an open healthcare dataset (also referred to herein as an "open dataset" or an "open claims dataset") compiled by a third-party entity, e.g., from at least one of a healthcare clearinghouse, doctor's office records, pharmacy records, or other patient data, may be incomplete. For example, certain treatments or therapies may be blocked in open datasets (e.g., blocked by the therapeutic manufacturer or distributor). Thus, the missing data in these datasets can severely hamper the ability to generate predictions for subjects (e.g., predictions as to whether subjects are eligible to receive a therapy).

Disclosed herein are methods, non-transitory computer readable medium, and computer system for training and deploying predictive models for generating health-based predictions. As an example, predictive models disclosed herein are useful for determining patient eligibility, such as patient eligibility for chimeric antigen receptor T-cell (CAR-T) therapy. Generally, predictive models are trained on datasets that leverage closed claims datasets with comprehensive patient data. The closed dataset is used to derive the ground truth label in a training example. In various embodiments, the closed dataset is linked to a corresponding open claims dataset such that the paired closed dataset and open claims dataset can be used to train a predictive model. In various embodiments, the closed dataset is modified to simulate data missingness of a target open claims dataset. These modified datasets can be generated by selectively dropping certain datapoints and/or features from closed datasets that include comprehensive patient data. Therefore, trained predictive models can be deployed to analyze open claims datasets to predict patient eligibility. In some embodiments, a superset may be generated from a combination of data from an open dataset and a closed dataset and used to derive the ground truth label in a training example or the predictive features used to train a predictive model. For example, a superset may be generated from a union of data points from an open dataset and a closed dataset.

In a method disclosed herein, a first dataset for one or more subjects is obtained, where the first dataset is obtained from a first source of first datasets that are missing data in comparison to second datasets from a second source. A machine learning model is applied to the obtained first dataset for at least one of the one or more subjects to generate a healthcare outcome, where the machine learning model is trained using training data comprising: a training incomplete dataset that shares one or more features of the obtained first dataset; and a ground truth label derived from a training complete dataset that comprises more features and/or data points than the training incomplete dataset. An action is taken regarding at least one of the one or more subjects based at least on the outcome.

In various embodiments, the training incomplete dataset may be derived from the training complete dataset by dropping one or more data points from the training complete dataset, which may comprise dropping each of the data points of a feature from the training complete dataset. The training incomplete dataset may further comprise patient-level data that is generated by transforming claim-level data. In various embodiments, dropping one or more data points from the training complete dataset may comprise: defining a first patient cohort in a target open claims dataset; defining a second patient cohort in the training complete dataset; generating a first distribution from the first patient cohort in the target open claims dataset; generating a second distribution from the second patient cohort in the training complete dataset at one of a patient level, product level, or pharmacy level; comparing the first distribution to the second distribution; and based on the comparison, selectively removing data points from the training complete dataset to align the second distribution of the training complete dataset with the first distribution of the target open claims dataset.

In various embodiments, defining a first patient cohort or defining a second patient cohort comprises identifying subjects in the target dataset or the training complete dataset that meet one or more criteria. The one or more criteria may comprise any of one or more diagnoses within a first period of time, a provided therapy within a second period of time, total time of enrollment, or one or more diagnoses within a first period of time and a provided therapy within a second period of time.

In various embodiments, the first distribution and the second distribution may represent a number of claims of each type per patient in the first patient cohort and the second patient cohort, respectively. In various embodiments, selectively removing data points from the training complete dataset comprises removing one or more claims from one or more patients in the second patient cohort such that a percentage of patients in the target dataset with no claims aligns with a percentage of patients in the training complete dataset with no claims. In various embodiments, the first distribution and the second distribution represent number of claims for a healthcare event of interest (e.g., filling a script for a specific prescription drug, or having a specific medical procedure) per patient in the first patient cohort and the second patient cohort, respectively. In various embodiments, selectively removing data points from the training complete dataset comprises removing one or more claims from one or more patients in the dataset of the second patient cohort to generate a modified dataset such that the first distribution aligns with a modified second distribution of the modified dataset.

In various embodiments, the first distribution and the second distribution represent a number of claims across pharmacies. In various embodiments, selectively removing data points from the training complete dataset comprises removing one or more claims from one or more patients in the second patient cohort to generate a modified second distribution of the modified second patient cohort. In various embodiments, data points are selectively removed from the training complete dataset such that a percentage of pharmacies of the first distribution with no claims aligns with a percentage of pharmacies of the modified second distribution with no claims. In various embodiments, data points are selectively removed from the training complete dataset such that the first distribution aligns with a modified second distribution of the modified second patient cohort.

In various embodiments, the training incomplete dataset is previously matched to the training complete dataset. In various embodiments, the training incomplete dataset is previously matched to the training complete dataset by identifying that both datasets correspond to a common patient. In various embodiments, the matched training incomplete dataset and the training complete dataset are used to generate additional training incomplete datasets or training complete supersets.

In various embodiments, features of the obtained first dataset may comprise one or more of a number of prior lines of therapies provided to the subject, whether one or more types of therapies were provided to the subject, enrollment data, demographics, diagnoses, procedures, provider data, clinical utilization, prescription medications, expenditures, and timing of previously listed medical events. In various embodiments, the one or more features shared between the training incomplete dataset and the obtained first dataset comprise one or more of procedures and prescription medications. In various embodiments, the missing data of the first dataset comprise features of any one of diagnoses, procedures, provider data, clinical utilization, prescription drug claims, expenditures. At least a portion of the missing data of the first dataset is due to blocked claims, e.g., as requested by a drug manufacturer or distributor. In various embodiments, the training complete dataset comprises at least data points for a feature of enrollment data that is not included in the training incomplete dataset.

In various embodiments, the diagnoses comprise diagnoses for refractory or relapsed multiple myeloma. In various embodiments, the one or more types of therapies may comprise a proteasome inhibitor, immunomodulatory agent, or anti-CD38 monoclonal antibody therapy. In various embodiments, the proteasome inhibitor comprises one of bortezomib, carfilzomib, or ixazomib. In various embodiments, the immunomodulatory agent comprises one of lenalidomide, thalidomide, or pomalidomide. In various embodiments, the anti-CD38 monoclonal antibody therapy may comprise one of daratumumab, daratumumab and hyaluronidase-fihj, or isatuximab-irfc.

In various embodiments, the number of prior lines of therapies is a threshold number of zero or more prior lines of therapy. In various embodiments, the number of prior lines of therapies is a threshold number of one or more prior lines of therapy. In various embodiments, the number of prior lines of therapies is a threshold number of two or more prior lines of therapy. In various embodiments, the number of prior lines of therapies is a threshold number of three or more prior lines of therapy. In various embodiments, the number of prior lines of therapies is a threshold number of four or more prior lines of therapy.

In various embodiments, the first dataset and the second dataset are healthcare datasets, e.g., datasets comprising healthcare claims, events, payments, or other patient-related data.

In various embodiments, the first dataset is an open dataset. In various embodiments, the first dataset is obtained from any one of clearinghouses, pharmacies, or software platforms other than a health insurance provider. In various embodiments, the second dataset is a closed dataset. In various embodiments, the second dataset is obtained from one or more health insurance providers. In various embodiments, the training incomplete dataset is derived by pooling data from multiple closed datasets. In various embodiments, the outcome is an indication of patient eligibility for a CAR-T therapy or other therapy for relapsed/refractory multiple myeloma (RRMM). In various embodiments, the CAR-T therapy or other therapy for RRMM is one of ABECMA (idecabtagene vicleucel), BREYANZI, TECARTUS, KYMRIAH, YESCARTA, or CARVYKTI ciltacabtagene autoleucel (cilta-cel).

In various embodiments, the ground truth label indicates that a patient is either eligible or not eligible to receive one or more therapies.

In various embodiments, the first dataset is obtained from a first source, where a machine learning model is trained to predict patient eligibility using datasets originating from the first source.

Additionally disclosed herein is a non-transitory computer readable medium comprising instructions that, when executed by a processor, cause the processor to: obtain a first dataset for one or more subjects, wherein the first dataset for the one or more subjects is obtained from a first source of datasets that are missing data in comparison to second datasets from a second source; apply a machine learning model to the obtained first dataset for at least one of the one or more subjects to generate an outcome, wherein the machine learning model is trained using training data comprising: a training incomplete dataset that shares one or more features of the obtained first dataset; and a ground truth label derived from a training complete dataset that comprises more features and/or data points than the training incomplete dataset; and taking an action related to at least one of the one or more subjects based at least on the outcome.

In various embodiments, the training incomplete dataset is derived from the training complete dataset by dropping one or more data points from the training complete dataset. In various embodiments, dropping one or more data points from the training complete dataset comprises dropping each of the data points of a feature from the training complete dataset. In various embodiments, the training incomplete dataset comprises patient-level data that is generated by transforming claim-level data. In various embodiments, dropping one or more data points from the training complete dataset comprises: defining a first patient cohort in a target dataset; defining a second patient cohort in the training complete dataset; generating a first distribution from the first patient cohort in the target dataset; generating a second distribution from the second patient cohort in the training complete dataset at one of a patient level, product level, or pharmacy level; comparing the first distribution to the second distribution; and based on the comparison, selectively removing data points from the training complete dataset to align the second distribution of the training complete dataset with the first distribution of the target dataset.

In various embodiments, defining a first patient cohort or defining a second patient cohort comprises identifying subjects in the target dataset or the training complete dataset that meet one or more criteria. In various embodiments, the one or more criteria comprise any of one or more diagnoses within a first period of time, a provided therapy within a second period of time, total time of enrollment, or one or more diagnoses within a first period of time and a provided therapy within a second period of time. In various embodiments, the first distribution and the second distribution represent a number of claims per patient in the first patient cohort and the second patient cohort, respectively. In various embodiments, selectively removing data points from the training complete dataset comprises removing one or more claims from one or more patients in the second patient cohort such that a percentage of patients in the target dataset with no claims aligns with a percentage of patients in the training complete dataset with no claims. In various embodiments, the first distribution and the second distribution represent a number of claims for a healthcare event of interest (e.g., filling a script for a specific prescription drug, or having a specific medical procedure) per patient in the first patient cohort and the second patient cohort, respectively. In various embodiments, selectively removing data points from the training complete dataset comprises removing one or more claims from one or more patients in the second patient cohort to generate a modified second patient cohort such that the first distribution aligns with a modified second distribution of the modified second patient cohort. In various embodiments, the first distribution and the second distribution represent a number of claims across a plurality of pharmacies.

In various embodiments, selectively removing data points from the training complete dataset comprises removing one or more claims from one or more patients in the second patient cohort to generate a modified second distribution of the modified dataset of the second patient cohort. In various embodiments, data points are selectively removed from the training complete dataset such that a percentage of pharmacies of the first distribution with no claims aligns with a percentage of pharmacies of the modified second distribution with no claims. In various embodiments, data points are selectively removed from the training complete dataset such that the first distribution aligns with a modified second distribution of the modified dataset of the second patient cohort.

In various embodiments, the training incomplete dataset is matched to the training complete dataset. In various embodiments, the training incomplete dataset is matched to the training complete dataset by identifying that both datasets correspond to a common patient. In various embodiments, the matched training incomplete dataset and the training complete dataset are used to generate additional training incomplete datasets or training complete supersets. In various embodiments, features of the obtained first dataset comprise one or more of a number of prior lines of therapies provided to the subject, whether one or more types of therapies were provided to the subject, enrollment data, demographics, diagnoses, procedures, provider data, clinical utilization, prescription medications, expenditures, or timing of previously listed medical events. In various embodiments, the one or more features shared between the training incomplete dataset and the obtained first dataset comprise one or more of procedures and prescription medications. In various embodiments, the missing data of the first dataset comprises at least features of diagnoses, procedures, provider data, clinical utilization, prescription drug claims, or expenditures. In various embodiments, at least a portion of the missing data of the first dataset is due to blocked claims. In various embodiments, the healthcare claims are blocked as requested by a drug manufacturer or distributor.

In various embodiments, the training complete dataset comprises at least data points for a feature of enrollment data that is not included in the training incomplete dataset. In various embodiments, the diagnoses comprise diagnoses for refractory or relapsed multiple myeloma. In various embodiments, the one or more types of therapies comprise at least one of a proteasome inhibitor, immunomodulatory agent, or anti-CD38 monoclonal antibody therapy. In various embodiments, the proteasome inhibitor comprises one of bortezomib, carfilzomib, or ixazomib. In various embodiments, the immunomodulatory agent comprises one of lenalidomide, thalidomide, or pomalidomide. In various embodiments, the anti-CD38 monoclonal antibody therapy comprises one of daratumumab, daratumumab and hyaluronidase-fihj, or isatuximab-irfc. In various embodiments, the number of prior lines of therapies is a threshold number of zero or more prior lines of therapy. In various embodiments, the number of prior lines of therapies is a threshold number of one or more prior lines of therapy. In various embodiments, the number of prior lines of therapies is a threshold number of two or more prior lines of therapy. In various embodiments, the number of prior lines of therapies is a threshold number of three or more prior lines of therapy. In various embodiments, the number of prior lines of therapies may be a threshold number of four or more prior lines of therapy.

In various embodiments, the first dataset and the second dataset are healthcare claims datasets. In various embodiments, the first dataset is an open claims dataset. In various embodiments, the first dataset is obtained from at least one of a clearinghouse, a pharmacy, or a software platform other than a health insurance provider software platform. In various embodiments, the second dataset is a closed claims dataset. In various embodiments, the second dataset is obtained from one or more health insurance providers. In various embodiments, the training incomplete dataset is derived by pooling data from a plurality of closed claims datasets. In various embodiments, the healthcare outcome is an indication of patient eligibility for a CAR-T therapy or other therapy for relapsed/refractory multiple myeloma (RRMM). In various embodiments, the CAR-T therapy or other therapy for RRMM is at least one of ABECMA (idecabtagene vicleucel), BREYANZI, TECARTUS, KYMRIAH, YESCARTA, teclistamab, talquetamab, or CARVYKTI (cilta-cel). In various embodiments, the ground truth label indicates that a patient is either eligible or not eligible to receive one or more therapies. In various embodiments, the first dataset is obtained from a first source, and a machine learning model is trained to predict patient eligibility using claims datasets originating from the first source.

In various embodiments, a system comprising at least one memory having computer-readable instructions stored thereon which, when executed by at least one processor coupled to the at least one memory, cause the at least one processor to obtain a first dataset for one or more subjects, wherein the first dataset is obtained from a first source of datasets that are missing data in comparison to second datasets from a second source. The processor is further caused to feed the obtained first dataset for at least one of the one or more subjects into a machine learning model configured to generate an outcome, where the machine learning model is trained using training data comprising a training incomplete dataset that shares one or more features of the obtained first dataset, and a ground truth label derived from a training complete dataset that comprises more features and/or data points than the training incomplete dataset. An action is taken with respect to at least one of the one or more subjects based at least on the outcome.

BRIEF DESCRIPTION OF THE DRAWINGS

These and other features, aspects, and advantages of the present invention will become better understood with regard to the following description and accompanying drawings.

Figure (FIG. 1A depicts a system environment overview for generating a prediction for a subject, in accordance with an embodiment.

FIG. 2B depicts, in further detail, the generation of a modified dataset from a closed dataset, in accordance with an embodiment.

FIG. 2C depicts, in further detail, the generation of a modified dataset from a closed dataset, in accordance with an embodiment.

FIG. 2D depicts an example dataset, in accordance with an embodiment.

FIG. 5 depicts an example patient's healthcare events over time as captured in closed and open datasets.

FIG. 10 depicts example scenarios for training a machine learning model in accordance with an embodiment.

DETAILED DESCRIPTION

Figure 1A:
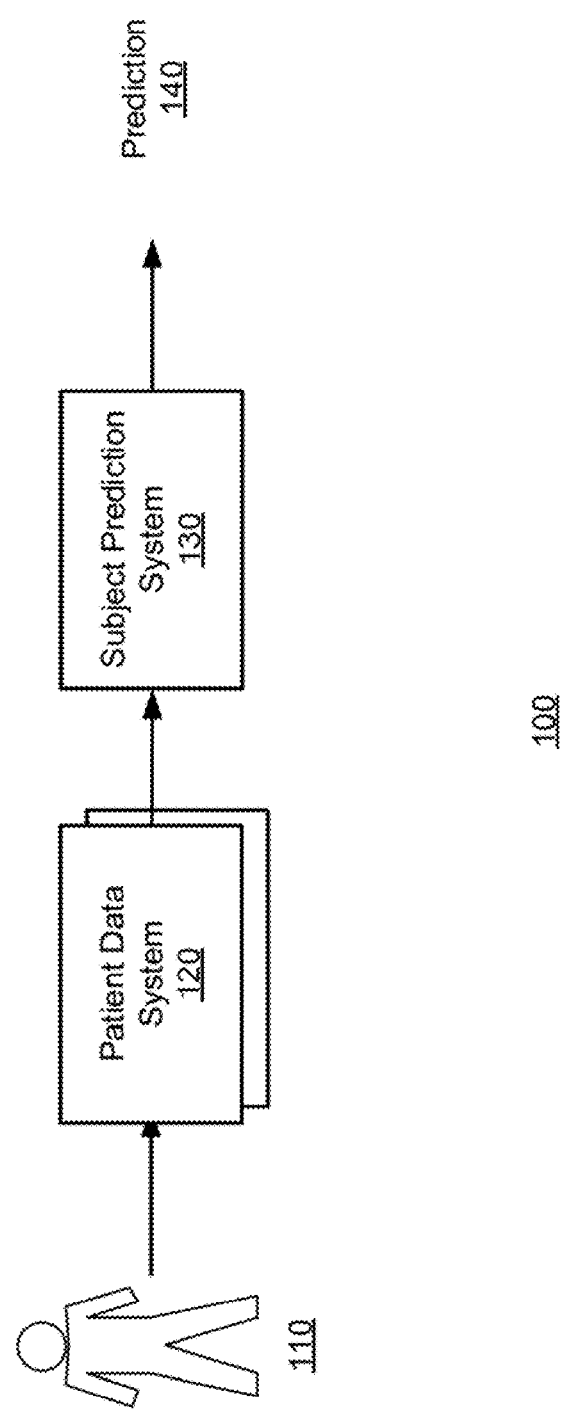
FIG. 1B depicts a block diagram of the subject prediction system, in accordance with an embodiment.

The various examples are described herein with reference to the accompanying drawings, which form a part hereof, and which show, by way of illustration, specific ways of practicing the examples. This specification may, however, be embodied in many different forms and should not be construed as being limited to the examples set forth herein; rather, these examples are provided so that this specification will be thorough and complete, and will fully convey the scope of the examples to those skilled in the art. Among other things, this specification may be embodied as methods or devices. Accordingly, any of the various examples herein may take the form of an entirely hardware example, an entirely software example or an example combining software and hardware aspects. The specification is, therefore, not to be taken in a limiting sense.

Throughout the specification and claims, the following terms take the meanings explicitly associated herein, unless the context clearly dictates otherwise:

The terms "subject" or "patient" are used interchangeably and generally encompass, without limitation, any of a cell, organism, human or non-human, male, female, or non-binary, whether in vivo, ex vivo, or in vitro.

The term "sample" can include, without limitation, any of a single cell or multiple cells or fragments of cells or an aliquot of body fluid, such as a blood sample, taken from a subject, by means including venipuncture, excretion, ejaculation, massage, biopsy, needle aspirate, lavage sample, scraping, surgical incision, or intervention or other means known in the art. Examples of an aliquot of body fluid include amniotic fluid, aqueous humor, bile, lymph, breast milk, interstitial fluid, blood, blood plasma, cerumen (earwax), Cowper's fluid (pre-ejaculatory fluid), chyle, chyme, female ejaculate, menses, mucus, saliva, urine, vomit, tears, vaginal lubrication, sweat, serum, semen, sebum, pus, pleural fluid, cerebrospinal fluid, synovial fluid, intracellular fluid, and vitreous humour.

The phrase "closed dataset" can refer to, without limitation, a dataset(s) that includes comprehensive patient claims data (e.g., includes comprehensive patient medical history including doctor visits, diagnoses received, and treatments received) generated through the use of a specific health insurance plan during specified periods of time (e.g., enrollment period). In various embodiments, a closed dataset can include, without limitation, data for patients for any of demographics, socioeconomic data, lab test results, date of death, diagnoses, enrollment data, procedures, provider data, clinical utilization, prescription drug claims, billing codes, and expenditures.

The phrase "open dataset" can refer to, without limitation, a dataset(s) in which patient data may be missing. For example, patient data may be missing in an open dataset because the source providing the patient data may not have access to the comprehensive patient data, or the source may be blocked from reporting a subset of patient data. For example, a healthcare maintenance organization (HMO) may operate or be affiliated with pharmacies such that prescription distribution and reimbursement is blocked from external entities that are commonly involved in prescription claims processing. Generally, an open dataset has less data per patient in comparison to data in a closed dataset. In various embodiments, an open dataset can be missing data for patients for any of demographics, socioeconomic data, lab test results, date of death, diagnoses, enrollment data, procedures, provider data, clinical utilization, prescription drug claims, billing codes, and expenditures. However, it should be noted that an open dataset may contain additional data that is not in a matching closed dataset, e.g., data related to events that are not reported to an insurance provider, such as when a patient pays for a service/treatment out of pocket without filing an insurance claim.

The phrase "superset" can refer to, without limitation, a dataset(s) generated from a combination of data from an open dataset and a closed dataset. For example, a superset may be generated from a union of data points from an open dataset and a closed dataset, e.g., to generate reference ground truth labels and/or features.

The phrase "training incomplete dataset" can refer to, without limitation, an open dataset(s) and/or a modified closed dataset(s) (e.g., a closed dataset in which data points and/or features have been dropped). Generally, the training incomplete dataset is used to generate features for inclusion in training examples that are used to train a predictive model to generate health-based predictions for subjects.

The phrase "training complete dataset" can refer to, without limitation, a closed dataset(s) that is used during training of a predictive model. In various embodiments, a training complete dataset is informative for generating reference ground truth labels for inclusion in training examples that are used to train a predictive model.

The phrase "obtaining a dataset" can encompass, without limitation, obtaining a set of data and/or obtaining a set of data and performing steps to organize the data (e.g., organize the data to create a cohort). For example, obtaining a dataset can encompass obtaining a set of data and organizing or transforming the data to a per-patient basis, on a per-product basis, or on a per-pharmacy basis. The phrase also may encompass receiving a set of data, e.g., from a third party. In various embodiments, "obtaining a dataset" involves receiving a set of data from a third party who has sourced the set of data from another party. For example, "obtaining a dataset" may encompass receiving a set of data from a provider (e.g., Symphony or IQVIA) who sources the set of data from another party (e.g., clearinghouses). As another example, "obtaining a dataset" may encompass receiving a set of data from a third party (e.g., IBM) who sources the set of data from a provider (e.g., insurance providers). Additionally, the phrase "obtaining a dataset" may encompass mining data from at least one database or at least one publication or a combination of databases and publications. A dataset can be obtained by one of skill in the art via a variety of known ways including stored on a storage memory.

The phrase "in various embodiments" as used herein does not necessarily refer to the same embodiment, though it may. Thus, as described below, various embodiments may be readily combined, without departing from the scope or spirit thereof.

As used herein, the term "or" is an inclusive "or" operator and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the below discussion, numerous references have been made regarding servers, services, interfaces, clients, peers, portals, platforms, modules, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server, without limitation, can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, server, device, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.), and may comprise various other components such as batteries, fans, motherboards, power supplies, etc. The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some examples, the various servers, systems, databases, or interfaces exchange data using standardized protocols or algorithms, possibly based on HTTP, HTTPS, AES, public-private key exchanges, web service APIs, or other electronic information exchanging methods. Data exchanges among devices can be conducted over a packet-switched network, the Internet, LAN, WAN, VPN, or other type of packet switched network; a circuit switched network; cell switched network; or other type of network.

I. System Environment Overview

Figure (FIG. 1A depicts a system environment overview for generating a health-based prediction for a subject, in accordance with an embodiment. The system environment 100 provides context in order to introduce a subject 110, a patient data system 120, and a subject prediction system 130 for determining a prediction 140. In various embodiments, the prediction 140 guides the patient care that is provided to the subject 110. For example, the prediction 140 may be a prediction of patient eligibility that identifies whether the subject 110 is eligible to receive a therapy. In various embodiments, in scenarios in which the prediction 140 identifies the subject 110 as likely eligible, the subject 110 can be provided the therapy. In scenarios in which the prediction 140 identifies the subject 110 as ineligible, the subject 110 does not receive the therapy. In particular embodiments, the therapy is a CAR-T therapy. Thus, the prediction 140 is a CAR-T therapy eligibility prediction.

In various embodiments, the prediction for the subject 110 can be used to guide conversations with third parties. For example, the third party can be a healthcare practitioner (e.g., physician, doctor, nurse, or caretaker). Here, if the prediction for the subject 110 identifies the subject as eligible to receive the therapy, the healthcare practitioner can be notified of available CAR-T therapies. In various embodiments, the prediction for the subject 110 can be provided to the healthcare practitioner. In various embodiments, the prediction for the subject 110 is withheld from the healthcare practitioner.

In various embodiments, the subject may be previously diagnosed with a cancer. In other embodiments, the subject may be nominally healthy, but is suspected to have a form of cancer (e.g., a subject who has exhibited symptoms associated with a cancer). In particular embodiments, the type of cancer in the subject may be multiple myeloma. In particular embodiments, the type of cancer in the subject may be relapsed or refractory multiple myeloma.

In various embodiments, the subject has previously received one or more therapies to treat the subject's cancer. As an example, such therapies can include proteasome inhibitors, immunomodulatory agents, and/or anti-CD38 monoclonal antibody therapy. Altogether, the methods described herein can be beneficial for identifying subjects who are eligible for receiving CAR-T therapy in view of their condition (e.g., cancer condition, patient's age, and/or therapies).

In various embodiments, a patient data system 120 obtains and stores data pertaining to the subject 110. In various embodiments, the patient data system 120 records the patient data for the subject 110. For example, the patient data system 120 records the patient's medical history (e.g., diagnoses, therapeutics (e.g., prescription drugs), treatments, hospital stays, insurance claims, and/or test results for the subject 110). In various embodiments, the patient data system 120 may be a point of care provider and therefore, the patient data system 120 obtains data related to a test sample obtained from the subject 110. The test sample can be obtained by the individual or by a third party, e.g., a medical professional. Examples of medical professionals include physicians, emergency medical technicians, nurses, first responders, psychologists, phlebotomists, medical physics personnel, nurse practitioners, surgeons, dentists, or any other medical professional.

In various embodiments, the system environment 100 includes multiple patient data systems 120 that each store patient data corresponding to the subject 110. For example, a first patient data system 120 can be an insurance provider in which the subject 110 has an insurance policy. Therefore, the insurance provider can maintain patient records for the subject 110. As another example, a second patient data system 120 can be a doctor's office that the subject 110 has previously visited. Therefore, the doctor's office can further maintain patient records for the subject 110. As yet another example, a patient data system 120 can be a database (e.g., publicly available database or proprietary database sourced by a third party) that holds patient data. Such databases may have de-identified the data. Examples of proprietary patient databases include IBM MarketScan Commercial Claims and Encounters, Optum Clinformatics Data Mart, Symphony Health Integrated DataVerse, and IQVIA Longitudinal Access and Adjudication Data. Generally, the patient data system 120 can be any one of an insurance company, an insurance payer, a doctor's office, a pharmacy, a hospital, a clearinghouse, or a patient database (e.g., a clinical data registry, patient registry, or disease registry).

Generally, the subject prediction system 130 analyzes patient data from the one or more patient data systems 120 and deploys a predictive model for determining a prediction 140 for the subject 110. Such a subject 110 can be a subject not previously encountered by the predictive model in any of the training datasets. In various embodiments, the predictive model generates a prediction 140 of a CAR-T eligibility prediction. In various embodiments, the prediction 140 can be a prediction as to whether the subject 110 is likely to respond to a CAR-T therapy. In various embodiments, the prediction 140 can include a recommended clinical approach (e.g., additional testing or monitoring of the patient) or therapy (e.g., provide CAR-T therapy or withhold CAR-T therapy). In various embodiments, the prediction 140 guides conversations with medical professional (e.g., physicians, emergency medical technicians, nurses, first responders, psychologists, phlebotomists, medical physics personnel, nurse practitioners, surgeons, dentists, or any other medical professional). For example, if the prediction for the subject 110 identifies the subject as eligible to receive the therapy, the medical professional caring for the subject can be notified of the available therapy. In various embodiments, the medical professional can administer treatment in a manner informed by prediction 140.

The subject prediction system 130 can include one or more computers, embodied as a computer system 400 as discussed below with respect to FIG. 4. Therefore, in various embodiments, the steps described in reference to the subject prediction system 130 are performed in silico.

Figure 1B:
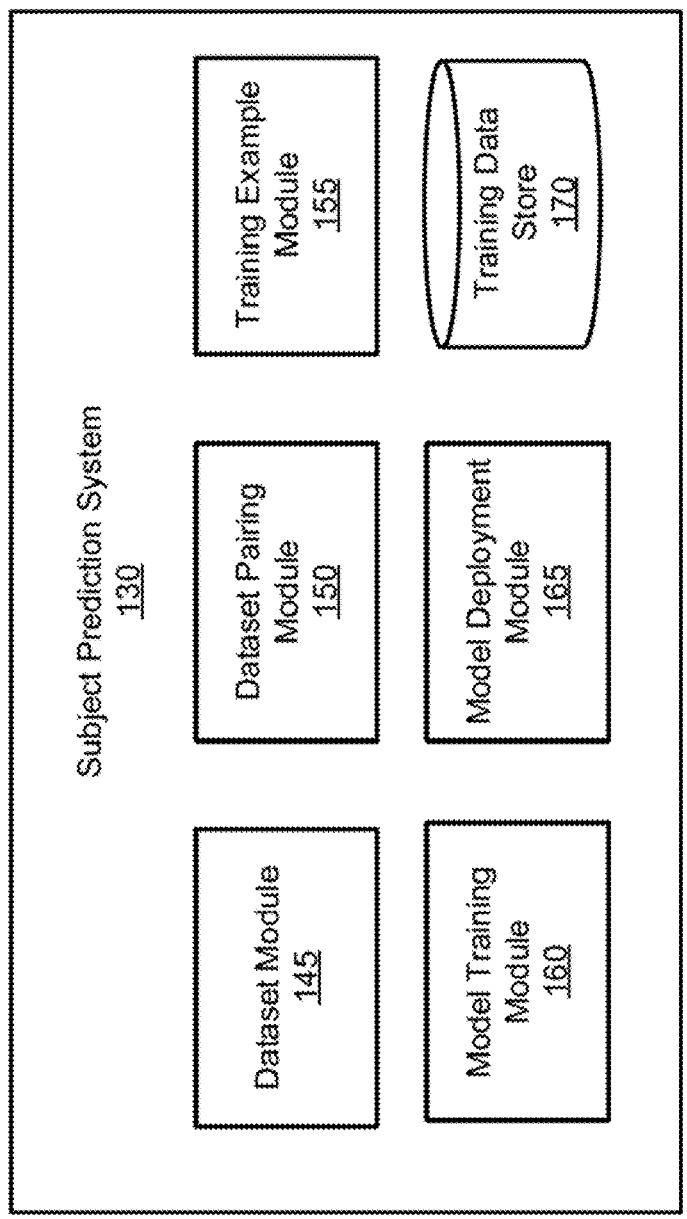

Reference is now made to FIG. 1B which depicts a block diagram illustrating the computer logic components of the subject prediction system 130, in accordance with an embodiment. Specifically, the subject prediction system 130 may include a dataset module 145, dataset pairing module 150, training example module 155, model training module 160, model deployment module 165, and a training data store 170.

Generally, the dataset module 145 obtains patient data for one or more patients. For example, the dataset module 145 can obtain patient datasets from one or more patient data systems 120 described above in relation to FIG. 1A. In various embodiments, the dataset module 145 receives patient data for at least 10 patients from one or more patient data systems 120. In various embodiments, the dataset module 145 receives patient data for at least 50 patients from one or more patient data systems 120. In various embodiments, the dataset module 145 receives patient data for at least 100 patients from one or more patient data systems 120. In various embodiments, the dataset module 145 receives patient data for at least 500 patients from one or more patient data systems 120. In various embodiments, the dataset module 145 receives patient data for at least 1000 patients from one or more patient data systems 120. In various embodiments, the dataset module 145 receives patient data for at least 10,000 patients from one or more patient data systems 120. In various embodiments, the dataset module 145 receives patient data for at least 100,000 patients from one or more patient data systems 120. In various embodiments, the dataset module 145 receives patient data for at least 1,000,000 patients from one or more patient data systems 120. In various embodiments, the dataset module 145 receives patient data for at least 5,000,000 patients from one or more patient data systems 120. In various embodiments, the dataset module 145 receives patient data for at least 10,000,000 patients from one or more patient data systems 120. In various embodiments, the dataset module 145 receives patient data for at least 50,000,000 patients from one or more patient data systems 120. In various embodiments, the dataset module 145 receives patient data for at least 100,000,000 patients from one or more patient data systems 120. In various embodiments, the dataset module 145 receives patient data for at least 300,000,000 patients from one or more patient data systems 120. In various embodiments, the dataset module 145 receives patient data for at least 1,000,000,000 patients from one or more patient data systems 120.

In various embodiments, the dataset module 145 can analyze the different datasets and characterize the different datasets according to the amount of patient data that is available in the dataset. For example, the dataset module 145 can characterize a dataset as one of a closed dataset, an open dataset, or a superset. As defined above and used herein, a closed dataset generally refers to a dataset that includes comprehensive patient data (e.g., includes comprehensive patient medical history including doctor visits, diagnoses received, and treatments received). As defined above and used herein, an open dataset generally refers to a dataset in which patient data is missing. For example, patient data may be missing in an open dataset because the source (e.g., patient data system 120) providing the patient data may not have access to the comprehensive patient data. In various embodiments, open datasets can be missing datapoints for one or more of diagnoses, enrollment data, procedures, provider data, clinical utilization, prescription drug claims, and expenditures. In various embodiments, closed datasets can include datapoints for one or more of diagnoses, enrollment data, procedures, provider data, clinical utilization, prescription drug claims, and expenditures. Further, as defined above, a superset refers to a dataset generated from a combination of data from an open dataset and a closed dataset. For example, a superset may be generated from a union of data points from an open dataset and a closed dataset.

In various embodiments, the dataset module 145 can characterize the dataset as either a closed dataset, an open dataset, or a superset based on the identity (or identities) of the patient data system(s) 120 providing the dataset. For example, closed datasets are often sourced from health insurance providers, insurance plans, or payers. As another example, datasets such as IBM MarketScan Commercial Claims and Encounters or Optum Clinformatics Data Mart can be characterized as closed datasets. Open datasets are often sourced from points of transactions including doctor's offices, hospitals, clearinghouses, pharmacies, or software platforms other than a health insurance provider. As another example, datasets such as Symphony Health Integrated DataVerse or IQVIA Longitudinal Access and Adjudication Data (LAAD) can be characterized as open datasets.

In various embodiments, the dataset module 145 receives characterizations of datasets and therefore, the dataset module 145 need not perform the characterization of the datasets. For example, the dataset module 145 can receive characterizations of the datasets from one or more patient data systems 120. Here, the patient data systems 120 can perform the characterization of the datasets and identify the datasets as a closed dataset, an open dataset, or a superset.

In various embodiments, the dataset module 145 can organize and/or transform the datasets. As one example, the dataset module 145 can transform the datasets such that the data is organized on a per-patient basis. Therefore, data pertaining to individual patients are organized together. As another example, the dataset module 145 can transform the datasets such that data is organized on a per-product basis. Therefore, data pertaining to individual products are organized together. As used herein, a product refers to a therapeutic, drug, or treatment that may have been provided or withheld from a patient. As another example, datasets can originate from various sources. Therefore, the dataset module 145 can transform the datasets such that data is organized on a per-source basis. For example, if datasets are obtained from multiple pharmacies, the dataset module 145 can transform the datasets such that data is organized on a per-pharmacy basis. Thus, data from individual pharmacies are organized together.

Generally, the dataset pairing module 150 generates pairings of datasets that correspond to individual subjects. In various embodiments, the dataset pairing module 150 modifies a closed dataset to simulate the data missingness present in an open dataset. Thus, the dataset pairing module 150 generates a modified closed dataset that mimics an open dataset. Here, the dataset pairing module 150 generates a pairing of datasets that includes the initial closed dataset and the modified closed dataset that mimics an open dataset. In various embodiments, the dataset pairing module 150 pairs a closed dataset to an already existing open dataset at the level of individual subjects. Here, the dataset pairing module 150 may link the closed dataset and open dataset based on verifying that datapoints from both datasets correspond to a single subject 110. For example, the dataset pairing module 150 may verify that the patient data in both of the closed dataset and the open dataset are overlapping (e.g., identical or similar treatments, identical or similar diagnoses, identical or similar physician) and therefore, the dataset pairing module pairs the closed dataset to the open dataset. In various embodiments, the dataset pairing module 150 receives the pairing identification from a third party who has verified that the datapoints from the two datasets correspond to the same subject and therefore, has performed the pairing between the closed dataset and the open dataset. In various embodiments, the dataset module 145 contains deidentified patient data with one or more patient identifiers created by the data provider using software (e.g., Datavant software) for the purpose of performing deidentified patient matching among datasets (facilitated by a translation table that maps a patient identifier in the first dataset to its potentially matching patient identifier in the second dataset). Here, the dataset pairing module 150 may link a closed dataset and open dataset based on one or more matching patient identifiers.

As an example of linking a closed and open dataset, Table 1 shows an example portion of a closed dataset, Table 2 shows an example portion of an open dataset, and Table 3 shows an example translation table.

TABLE 1

Example Portion of Closed Dataset

| closed dataset | Patient ID i | Patient ID ii |
|---|---|---|
| Patient 1 | abcd | 1234 |
| Patient 2 | efgh | 5678 |
| Patient 3 | ijkl | 9000 |

TABLE 2

Example Portion of Open Dataset

| open dataset | Patient ID A | Patient ID B |
|---|---|---|
| Patient 4 | aaa1 | abc1 |
| Patient 5 | bbb3 | abc2 |
| Patient 6 | ccc5 | abc3 |

TABLE 3

Example Translation Table
Patient ID translation table for patients in closed dataset

| | Patient ID i | Patient ID ii | Patient ID A | Patient ID B |
|---|---|---|---|---|
| Patient 1 | abcd | 1234 | aaa1 | abc1 |
| Patient 2 | efgh | 5678 | bbb3 | aaa1 |
| Patient 3 | ijkl | 9000 | cde4 | abc3 |

Here, Table 1 and Table 2 corresponding to closed and open datasets, respectively, include data for differently labeled patients (e.g., Patients 1-3 in Table 1 and Patients 4-6 in Table 2). Each patient includes a first identifier (e.g., Patient ID i in Table 1 and Patient ID A in Table 2) and a second identifier (e.g., Patient ID ii in Table 1 and Patient ID B in Table 2). The example translation table shown in Table 3 includes mappings between patient identifiers in the first dataset and potentially matching patient identifiers in the second dataset.

Here, if a match between both the first patient identifier and the second patient identifier is required, then Patient 1 is matched to Patient 4. Specifically, the Patient ID i=abcd and Patient ID ii=1234 shown in Table 1, as well as Patient ID A=aaa1 and Patient ID B=abc1 shown in Table 2 are also found in the translation table in Table 3 as corresponding to a single patient. If a match only between the first patient identifier (e.g., Patient ID i and Patient ID A) is required, then the following 2 patients are matched: Patient 1=Patient 4 and Patient 2=Patient 5. If a match only between the second patient identifier (e.g., Patient ID ii and Patient ID B) is required, then the following 2 patients are matched: Patient 1=Patient 4 and Patient 3=Patient 6.

The training example module 155 generates a training example useful for training predictive models. In various embodiments, the training example module 155 analyzes the paired datasets to generate features that are informative for predicting whether a patient is eligible for therapy. Furthermore, the training example module 155 analyzes the paired datasets to generate a reference ground truth, such as that identifies whether the patient is eligible or ineligible. For example, the training example module 155 can analyze the closed dataset and/or a superset of the pairing to determine a reference ground truth value based on the comprehensive data that is available in the closed dataset. The reference ground truth can be an indication of whether the patient is eligible or ineligible for therapy within a desired timeframe. For example, in the context of determining CAR T-cell therapy eligibility, the closed dataset and/or superset can identify whether the subject has received one or more therapies including proteasome inhibitors, immune modulatory agents, or anti-CD38 monoclonal antibody therapy. Specifically, the closed dataset and/or superset can identify whether the subject has previously received lenalidomide (REVLIMID). Thus, the patient eligibility for CAR-T therapy (i.e., the reference ground truth) can be determined based on the therapies that the subject has received prior to a specified time.

In various embodiments, the features extracted from the open dataset, modified closed dataset, or superset of the paired open and closed datasets may comprise one or more of: a number of prior lines of therapies provided to the subject, whether one or more types of therapies were provided to the subject, enrollment data, demographics, diagnoses, procedures, provider data, clinical utilization, prescription medications, expenditures, and timing of previously listed medical events.

In various embodiments, the ground truth can be determined based on the subject data in the closed dataset and/or the superset of the paired datasets, such as one or more lines of prior therapies that the subject has received. In various embodiments, the ground truth can identify an eligible patient according to the following criteria:
  whether the subject is an adult (e.g., age 18+),
  whether the subject has received at least a threshold number of prior lines of therapy (e.g., zero or more lines of therapy, one or more lines of therapy, two or more lines of therapy, three or more lines of therapy, or four or more lines of therapy),
  whether the subject has received at least one of each of a proteasome inhibitor, an immunomodulatory agent, and an anti-CD38 monoclonal antibody therapy,
  whether the subject has received one or more diagnoses of relapsed or refractory multiple myeloma,
  whether the subject has received at least a threshold number of prior lines of therapy including a proteasome inhibitor, an immunomodulatory agent, and an anti-CD38 monoclonal antibody therapy, or
  whether the subject has relapsed or refractory multiple myeloma and has received at least a threshold number of prior lines of therapy including a proteasome inhibitor, an immunomodulatory agent, and an anti-CD38 monoclonal antibody therapy.

In various embodiments, the threshold number of prior lines of therapy is three. In various other embodiments, the threshold number of prior lines of therapy is four. In various embodiments, the proteasome inhibitor is any one of Bortezomib (VELCADE), Carfilzomib (KYPROLIS), and Ixazomib (NINLARO). In various embodiments, the immunomodulatory agent is any one of lenalidomide (REVLIMID), thalidomide (THALOMID), and pomalidomide (POMALYST). In various embodiments, the anti-CD38 monoclonal antibody therapy is any one of daratumumab (DARZALEX), daratumumab and hyaluronidase-fihj (DARZALEX FASPRO), and isatuximab-irfc (SARCLISA).

In various embodiments, the training example module 155 analyzes the open dataset, the modified closed dataset modified to mimic the open dataset, or the paired dataset to extract features from the dataset. Example features include the number of prior lines of therapies provided to the subject, whether one or more types of therapies were provided to the subject, enrollment data, demographics, diagnoses, procedures, provider data, clinical utilization, prescription medications, expenditures, or timing of previously listed medical events. In various embodiments, the open dataset in the pairing can be missing patient data. For example, in the context of determining CAR-T eligibility, the open dataset (or modified closed dataset that has been modified to mimic the open dataset) may not include sufficient data to indicate whether the patient has received one or more prior lines of therapies. As such, the training example generator 155 does not determine the reference ground truth from the open dataset (or modified closed dataset that has been modified to mimic the open dataset).

The training example module 155 generates training examples across one or more subjects. In various embodiments, the training example module 155 generates one training example for one subject. In various other embodiments, the training example module 155 generates more than one training example for each subject. In various embodiments, a training example includes at least 1) features extracted from the open dataset (or modified closed dataset that has been modified to mimic the open dataset) and 2) the reference ground truth determined from the closed dataset and/or superset. Thus, the training examples can be used to train the predictive model. In various embodiments, the training example module 155 can store the training examples in the training data store 170 for subsequent retrieval and usage in training predictive models.

The model training module 160 trains the predictive model using the training examples generated by the training example module 155. In various embodiments, the model training module 160 iteratively trains the predictive model across the training examples such that the predictive model improves its predictive capacity. In various embodiments, the model training module 160 implements a supervised machine learning algorithm to train the predictive model. For example, the predictive model is trained to improve its ability to predict patient eligibility by minimizing a difference (e.g., a loss function) between a prediction of the predictive model and the reference ground truths in the training examples until the model converges.

The model deployment module 165 deploys predictive models to predict patient eligibilities for subject. For example, referring again to FIG. 1A, the model deployment module 165 can deploy a predictive model to generate a prediction 140 for subject 110. The model deployment module 165 deploys the predictive model which analyzes features from an open dataset that includes datapoints for the subject 110. Generally, open datasets are more accessible and available in comparison to closed datasets. Furthermore, open datasets often contain more patients than closed datasets, thereby enabling the analysis of many more patients. For example, certain patient data system 120 (e.g., insurers) may not be willing to provide closed datasets to the subject prediction system 130. Thus, the predictive model is deployed to analyze features of the open datasets given that they are available across increased number of patients and can be obtained from different sources (e.g., doctor's offices, publicly available databases, pharmacies, and the like). In various embodiments, the deployment of the predictive model yields probabilities (e.g., continuous probabilities between 0 and 1) that indicate the probability of eligibility for therapy. For example, a probability closer to 1 can indicate that the subject is more likely eligible whereas a probability closer to 0 can indicate that the subject is less likely eligible.

In various embodiments, the model deployment module 165 deploys a predictive model to analyze features of a subject that are extracted from an open dataset, where the open dataset shares one or more features with a dataset that was used to train the predictive model. In various embodiments, the model deployment module 165 deploys a predictive model to analyze features of a subject that are extracted from an open dataset, where each of the features of the open dataset are shared with a dataset that was used to train the predictive model. Such a dataset that was used to train the predictive model is also referred to herein as a training incomplete dataset. Thus, the predictive model is trained using features derived from training incomplete datasets that simulate the data missingness of the open dataset, thereby enabling the predictive model to accurately generate a prediction for a subject where only data from an open dataset is available.

The components of the subject prediction system 130 are hereafter described in reference to two phases: 1) a training phase and 2) a deployment phase. More specifically, the training phase refers to the building and training of one or more predictive models based on training data, such as individual training examples generated by the training example module 155. Therefore, the predictive models are trained using the training examples such that during the deployment phase, implementation of the predictive models enables the generation of a health-based prediction for a subject (e.g., subject 110 in FIG. 1A).

In some embodiments, the components of the subject prediction system 130 are applied during one of the training phase and the deployment phase. For example, the dataset pairing module 150, training example module 155, model training module 160, and training data store 170 are applied during the training phase to train a predictive model. Additionally, the model deployment module 165 is implemented during the deployment phase. In various embodiments, the components of the subject prediction system 130 can be performed by different parties depending on whether the components are applied during the training phase or the deployment phase. In such scenarios, the training and deployment of the prediction model are performed by different parties. For example, the dataset pairing module 150, training example module 155, model training module 160, and training data store 170 applied during the training phase can be employed by a first party (e.g., to train a predictive model) and the model deployment module 165 applied during the deployment phase can be performed by a second party (e.g., to deploy the predictive model).

II. Methods for Determining Patient Outcomes

II.A. Generating Training Examples from Datasets

Disclosed herein are methods for generating training examples derived from different datasets (e.g., open datasets, closed datasets, and supersets) that can be used to train a predictive model. Generally, a training example includes 1) features extracted from the open dataset, modified closed dataset that has been modified to mimic the open dataset, or superset and 2) the reference ground truth determined from the closed dataset and/or a superset generated from a combination of data from an open dataset and a closed dataset. Here, the reference ground truth and features are paired (the closed dataset or superset, from which the reference ground truth is determined, and the open dataset (or modified closed dataset) are paired) as they both correspond at the level of an individual subject. Thus, the features extracted from the open dataset, modified closed dataset, or superset can be informative for predicting the corresponding reference ground truth determined from the closed dataset or superset.

In various embodiments, generating training examples includes modifying a closed dataset such that the modified closed dataset simulates the missing data of a target dataset. Thus, the closed dataset and the modified closed dataset can be used together to generate training examples. In various embodiments, generating training examples include pairing a closed dataset to an already existing open dataset. For example, the closed dataset and the existing open dataset may correspond to the same subject, but be obtained from different sources. Thus, the closed dataset and existing open dataset may be paired together given that they both include subject data pertaining to the same subject.

Figure 2A:
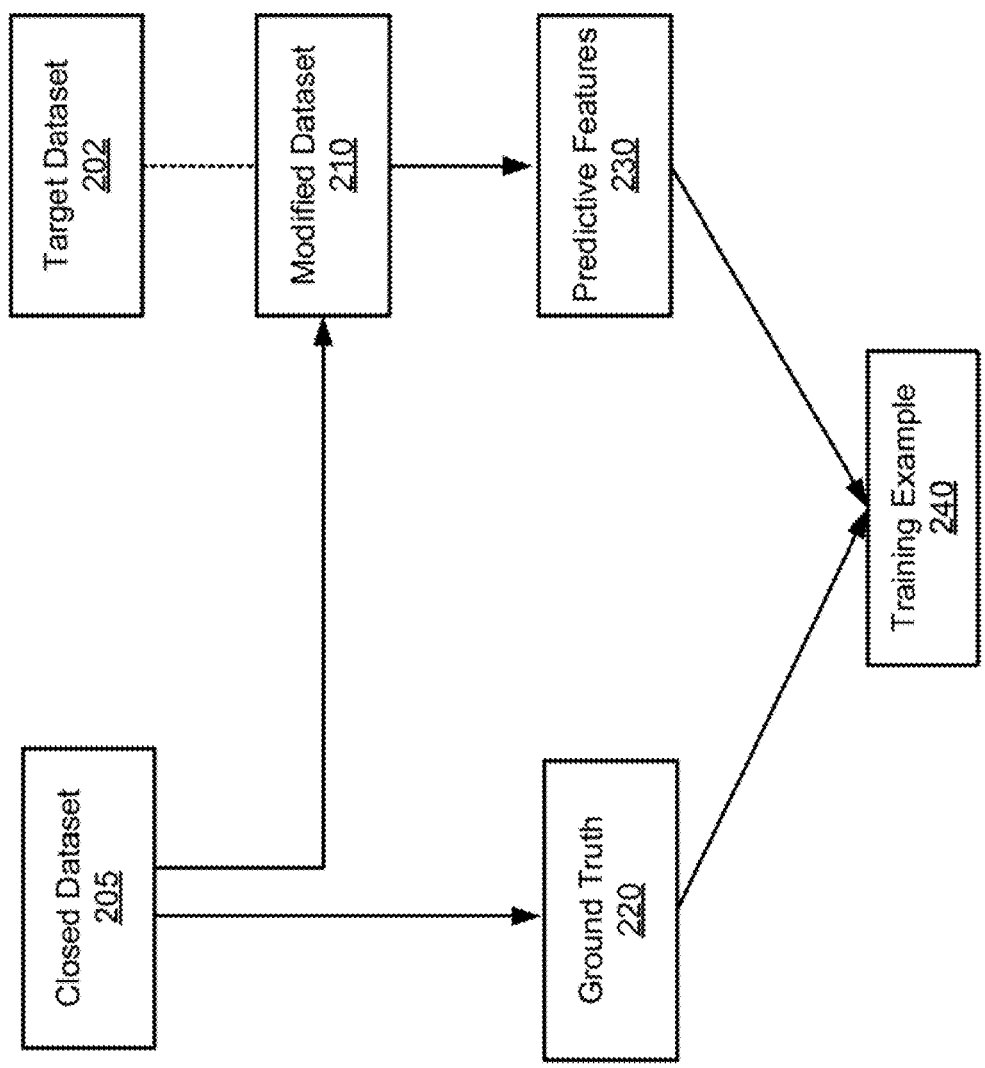
FIG. 2A depicts an example flow diagram for generating a training example for training a predictive model, in accordance with an embodiment.

FIG. 2A depicts an example flow diagram for generating a training example for training a predictive model, in accordance with a first embodiment. Here, as shown in FIG. 2A, the closed dataset 205 is modified to generate a modified dataset 210. The closed dataset 205 is also referred to herein as a training complete dataset. The modified dataset 210 is also referred to herein as a training incomplete dataset. Generally, one or more data points and/or features of the closed dataset 205 are dropped to generate the modified dataset 210.

Although FIG. 2A shows a single closed dataset 205 that is used to generate a single modified dataset 210, in various embodiments, multiple closed datasets can be pooled and datapoints can be dropped from the pooled closed datasets to generate a single modified dataset. Therefore, a modified dataset 210 can be derived by at least pooling data from multiple closed datasets. This enables the generation of larger modified datasets 210 (e.g., larger with datapoints pertaining to hundreds, thousands, tens of thousands, or hundreds of thousands of patients), which is useful for training the predictive model.

In various embodiments, the closed dataset 205 can be pre-filtered to define a patient cohort including patients that satisfy one or more criteria. Thus, the steps described hereafter referring to the closed dataset 205 can also apply to a defined patient cohort of the closed dataset 205. In various embodiments, criteria for defining a patient cohort can include a number of prior diagnoses, a date of one or more prior diagnoses, a time interval between prior diagnoses, a number of lines of therapies previously received, a date that a line of therapy was received, a time interval between two lines of therapies previously received, age 18+, continuous enrollment during a specific time period, or any combination thereof. For example, a criterion can be that the patient has previously received a cancer diagnosis. As another example, a criterion can be that the patient has previously received two cancer diagnoses. For example, a criterion can be that the patient has previously received two cancer diagnoses separated by at least 30 days. For example, a criterion can be that the patient has previously received a line of therapy. For example, a criterion can be that the patient has previously received a line of therapy within a particular date range. For example, a criterion can be that the patient has previously received a cancer diagnosis and received a line of therapy within a date range.

In various embodiments, the data points and/or features are selected to be dropped such that the modified dataset 210 simulates the missing data of the target dataset 202. In various embodiments, the target dataset 202 is an open dataset that is missing one or more data points in comparison to a comprehensive closed dataset. The target dataset 202 can represent a reference dataset such that the modified dataset 210 is generated to mimic the target dataset 202. For example, the target dataset 202 can have one or more features and therefore, the modified dataset 210 can be generated to also have one or more features. In various embodiments, the modified dataset 210 shares 2 or more features that are similarly included in the target dataset 202. In various embodiments, the modified dataset 210 shares 3 or more features that are similarly included in the target dataset 202. In various embodiments, the modified dataset 210 shares 4 or more features that are similarly included in the target dataset 202. In various embodiments, the modified dataset 210 shares at least 5 features that are similarly included in the target dataset 202. In various embodiments, the modified dataset 210 shares at least 6 features, at least 7 features, at least 8 features, at least 9 features, at least 10 features, at least 11 features, at least 12 features, at least 13 features, at least 14 features, at least 15 features, at least 16 features, at least 17 features, at least 18 features, at least 19 features, or at least 20 features that are similarly included in the target dataset 202. In particular embodiments, the modified dataset 210 shares at least 15 features that are similarly included in the target dataset 202. In particular embodiments, the modified dataset 210 shares at least 20 features that are similarly included in the target dataset 202. In particular embodiments, the modified dataset 210 shares at least 30 features that are similarly included in the target dataset 202. In particular embodiments, the modified dataset 210 shares at least 40 features that are similarly included in the target dataset 202. In particular embodiments, the modified dataset 210 shares at least 50 features that are similarly included in the target dataset 202. In particular embodiments, the modified dataset 210 shares at least 75 features that are similarly included in the target dataset 202. In particular embodiments, the modified dataset 210 shares at least 100 features that are similarly included in the target dataset 202. In particular embodiments, the modified dataset 210 shares at least 200 features that are similarly included in the target dataset 202. In particular embodiments, the modified dataset 210 shares at least 500 features that are similarly included in the target dataset 202. In particular embodiments, the modified dataset 210 shares at least 1000 features that are similarly included in the target dataset 202. In particular embodiments, the modified dataset 210 shares at least 2500 features that are similarly included in the target dataset 202. In particular embodiments, the modified dataset 210 shares at least 5000 features that are similarly included in the target dataset 202. In particular embodiments, the modified dataset 210 shares at least 10,000 features that are similarly included in the target dataset 202. In particular embodiments, the modified dataset 210 shares at least 100,000 features that are similarly included in the target dataset 202. In various embodiments, each of the features of the modified dataset 210 are shared by the target dataset 202.

In various embodiments, a target dataset 202 can be specific for a particular source. In other words, the target dataset 202 can be representative of the types of datasets that are typically obtained from a particular source. For example, a particular source, such as a pharmacy, may provide datasets that have W number of features. Therefore, the target dataset 202 can have similar or the same W number of features, which enables the generation of modified datasets 210 that share one or more of the W features with the target dataset 202. Thus, a predictive model can be trained using the modified datasets 210 such that the predictive model can accurately generate predictions when analyzing datasets (e.g., datasets having W number of features) obtained from the particular source.

In various embodiments, the target dataset 202 can be pre-filtered to define a patient cohort including patients that satisfy one or more criteria. For example, the target dataset 202 can undergo pre-filtering to define a patient cohort when the closed dataset 205 also undergoes pre-filtering to define a patient cohort. In various embodiments, the one or more criteria used to define a patient cohort in the closed dataset 205 are also used to define a patient cohort in the target dataset 202. This enables the relevant comparison of distributions from defined cohorts of the closed dataset 205 and the target dataset 202, as is described in further detail herein.

In various embodiments, criteria for defining a patient cohort can include a number of prior diagnoses, a date of one or more prior diagnoses, a time interval between prior diagnoses, a number of lines of therapies previously received, a date that a line of therapy was received, a time interval between two lines of therapies previously received, age 18+, continuous enrollment during a specific time period, or any combination thereof. In various embodiments, criteria need not include continuous enrollment. For example, a criterion can be that the patient has previously received a cancer diagnosis. As another example, a criterion can be that the patient has previously received two cancer diagnoses. For example, a criterion can be that the patient has previously received two cancer diagnoses separated by at least 30 days. For example, a criterion can be that the patient has previously received a line of therapy. For example, a criterion can be that the patient has previously received a line of therapy within a particular date range. For example, a criterion can be that the patient has previously received a cancer diagnosis and received a line of therapy within a date range.

As shown in FIG. 2A, the closed dataset 205 is analyzed to determine a ground truth 220. As an example, the ground truth is a label indicating that the subject is eligible or ineligible for therapy. Here, the ground truth can be determined based on the subject data in the closed dataset 205, such as one or more lines of prior therapies that the subject has received. Alternatively, the ground truth can be determined based on the subject data in a superset generated from a combination of data from an open dataset and the closed dataset. Additionally, the modified dataset 210 is analyzed to determine predictive features 230 of the modified dataset 210. Here, the modified dataset 210 is missing data points and/or features in comparison to the closed dataset 205 and therefore, the predictive features 230 can be informative for determining patient eligibility (e.g., ground truth 220) without the need for the data points and/or features that are missing. As shown in FIG. 2A, the ground truth 220 and the predictive features 230 are combined to generate training examples 240. In various embodiments, the process shown in FIG. 2A can be repeated across different patients, thereby generating training examples across the different patients. In various embodiments, the process shown in FIG. 2A can be repeated across different timeframes for a single patient, thereby generating multiple training examples across different timeframes for the single patient. Thus, the training examples 240 can be used to train a predictive model.

Generally, one or more datapoints are selectively dropped from the closed dataset 205. In various embodiments, one or more datapoints are selectively dropped using random selection while ensuring that statistical distribution constraints are satisfied. For example, one or more datapoints can be selectively dropped until a constraint is violated, after which datapoints are no longer dropped. As another example, if the dropping of a datapoint causes a violation of a constraint, that datapoint is kept in the dataset and one or more other datapoints are dropped while ensuring that the statistical distribution constraints are satisfied.

FIG. 2B depicts, in further detail, the generation of the modified dataset from a closed dataset, in accordance with the first embodiment shown in FIG. 2A. FIG. 2C depicts, in further detail, the generation of the modified dataset from a closed dataset, in accordance with the first embodiment shown in FIG. 2A. Specifically, each of FIG. 2B and FIG. 2C shows a first distribution 250 and a second distribution 260 representing number of claims for patients in respective datasets. In other embodiments, the first distribution 250 and second distribution 260 can represent distribution of values for any of the aforementioned features in the datasets (e.g., one or more types of therapies were provided to the subject, enrollment data, demographics, diagnoses, procedures, provider data, clinical utilization, prescription medications, expenditures, and timing of previously listed medical events).

For example, as shown in FIGS. 2B and 2C, the first distribution 250 can represent the number of claims for a product per patient in the closed dataset 205 (e.g., a training complete dataset) or a defined patient cohort in the closed dataset 205. Additionally, the second distribution 260 can represent the number of claims for a product per patient in a target dataset (e.g., target dataset 202) or a defined patient cohort in the target dataset 202. Each distribution (e.g., first distribution 250 or second distribution 260) can be a statistical distribution. For example, in FIG. 2B, the first distribution 250 and second distribution 260 may be multinomial distributions. As another example, in FIG. 2C, the first distribution 250 and the second distribution 260 may be Poisson distributions.

In various embodiments, the one or more datapoints are selectively dropped from the closed dataset 205 such that the corresponding first distribution 250 is shifted towards the second distribution 260 of the target dataset 202. For example, one or more datapoints are selectively dropped from the closed dataset 205 such that the corresponding first distribution 250 aligns with the second distribution 260 of the target dataset 202. Two distributions may be aligned with one another if the distributions are not statistically significantly different (e.g., mean and standard deviation of two distributions are not statistically significantly different) (e.g., p-value<0.05 or <0.10 for statistical significance). Directional arrows shown in both FIGS. 2B and 2C indicate the shifting direction of the first distribution 250 of the closed dataset 205 towards the second distribution 260 of the target dataset 202 as data points are selectively dropped from the closed dataset 205.

In various embodiments, one or more datapoints are selectively dropped such that a portion of the first distribution 250 is shifted towards and/or aligned with the second distribution 260 of the target dataset 202. As a specific example, assuming again that the first and second distributions represent the number of claims per patient (as is shown in FIG. 2B or 2C). One or more datapoints are selectively dropped such that a percentage of patients in the closed dataset 205 (e.g., a training complete dataset) with Xnumber of claims aligns with a percentage of patients in the target dataset with Xnumber of claims. In various embodiments, the Xnumber of claims is zero, 1 claim, 2 claims, 3 claims, 4 claims, 5 claims, 6 claims, 7 claims, 8 claims, 9 claims, 10 claims, 15 claims, 20 claims, 25 claims, 30 claims, 40 claims, 50 claims, 60 claims, 70 claims, 80 claims, 90 claims, or 100 claims. In particular embodiments, the Xnumber of claims is 5 claims, 10 claims, 25 claims, 50 claims, or 100 claims. Thus, one or more datapoints are selectively dropped such that the portion of the first distribution 250 corresponding to the X number of claims is shifted to or aligned with the portion of the second distribution 260 corresponding to the Xnumber of claims.

As another example, assume that the first and second distributions represent number of claims across pharmacies. Thus, one or more datapoints are selectively dropped such that a percentage of pharmacies in the closed dataset 205 (e.g., a training complete dataset) with Y number of claims aligns with a percentage of pharmacies in the target dataset with Y number of claims. In various embodiments, the Y number of claims is zero number of claims. In various embodiments, the Y number of claims is at least 1 claim, at least 2 claims, at least 3 claims, at least 4 claims, at least 5 claims, at least 6 claims, at least 7 claims, at least 8 claims, at least 9 claims, at least 10 claims, at least 15 claims, at least 20 claims, at least 25 claims, at least 50 claims, at least 75 claims, at least 100 claims, at least 150 claims, at least 200 claims, at least 250 claims, at least 500 claims, at least 1000, or at least 5000 claims. Thus, one or more datapoints are selectively dropped such that the portion of the first distribution 250 corresponding to the Y number of claims is shifted to or aligned with the portion of the second distribution 260 corresponding to the Y number of claims.

In various embodiments, the first distribution and the second distribution represent number of claims for a specific prescription drug of interest. Thus, one or more datapoints are selectively dropped such that a number of claims for a specific prescription drug of interest in the closed dataset 205 (e.g., a training complete dataset) aligns with a number of claims for a specific prescription drug of interest in the target dataset. In various embodiments, the number of claims for a specific prescription drug of interest is zero. In various embodiments, the number of claims for a specific prescription drug of interest is at least 1 claim, at least 2 claims, at least 3 claims, at least 4 claims, at least 5 claims, at least 6 claims, at least 7 claims, at least 8 claims, at least 9 claims, at least 10 claims, at least 15 claims, at least 20 claims, at least 25 claims, at least 50 claims, at least 75 claims, at least 100 claims, at least 150 claims, at least 200 claims, at least 250 claims, at least 500 claims, at least 1000, or at least 5000 claims. Thus, one or more datapoints are selectively dropped such that the portion of the first distribution 250 corresponding to the number of claims for a specific prescription drug of interest is shifted to or aligned with the portion of the second distribution 260 corresponding to the number of claims for a specific prescription drug of interest.

FIG. 2D depicts an example dataset, in accordance with an embodiment. As shown in FIG. 2D, the example dataset is represented as a table where features of the dataset are included as columns of the table and patients are included as rows of the table. Individual datapoints are shown in the cells of the table. In various embodiments, the dataset can be differently structured (e.g., features can be listed as the rows and patients are included as columns). Although FIG. 2D depicts three features (e.g., feature 1, feature 2, and feature 3) as well as three patients (e.g., patient 1, patient 2, and patient 3), various embodiments of a dataset can include additional or fewer features and/or patients. In some scenarios, a dataset includes data for one patient or data for two patients. In some scenarios, a dataset includes data for more than three patients. In some scenarios, a dataset includes data for at least 10, at least 25, at least 50, at least 100, at least 500, at least 1000, at least 5000, at least 10,000, at least 25,000, at least 50,000, at least 100,000, at least 500,000, or at least 1,000,000 patients. In various embodiments, a dataset includes data for 1 feature. In various embodiments, a dataset includes data for 2 features. In various embodiments, a dataset includes data for at least 4 features, at least 5 features, at least 6 features, at least 7 features, at least 8 features, at least 9 features, at least 10 features, at least 20 features, at least 50 features, at least 100 features, at least 200 features, at least 500 features, or at least 1000 features.

In various embodiments, the dataset shown in FIG. 2D is an open dataset, such as a training incomplete dataset and therefore, one or more datapoints in the dataset can be missing. For example, one or more of the datapoints (e.g., datapoint 1.1, datapoint 1.2, datapoint 1.3, and so on) can be missing in the dataset. In various embodiments, the dataset shown in FIG. 2D is a closed dataset, such as a training complete dataset and therefore, datapoints in the dataset are available.

In various embodiments, if the dataset is a training complete dataset, one or more datapoints can be selectively dropped to generate a training incomplete dataset. For example, referring again to the process of generating a modified dataset 210 described in FIG. 2A, one or more datapoints can be dropped from the dataset shown in FIG. 2D to generate the modified dataset 210. As another example, referring again to the use of distributions in FIGS. 2B and 2C, one or more datapoints of the dataset shown in FIG. 2D can be selectively dropped which would cause the first distribution 250 of the closed dataset 205 to shift towards the second distribution 260 of the target dataset 202. As a specific example, assume that the distributions represent the feature of the number of claims for a product per patient and that feature 1 of the dataset in FIG. 2D represents the feature of the number of claims for a product per patient. Therefore, one or more of the datapoints under feature 1 (e.g., datapoint 1.1, datapoint 2.1, or datapoints 3.1) can be selectively dropped to cause the distribution of the closed dataset to align with the distribution of the target dataset.

Figure 2E:
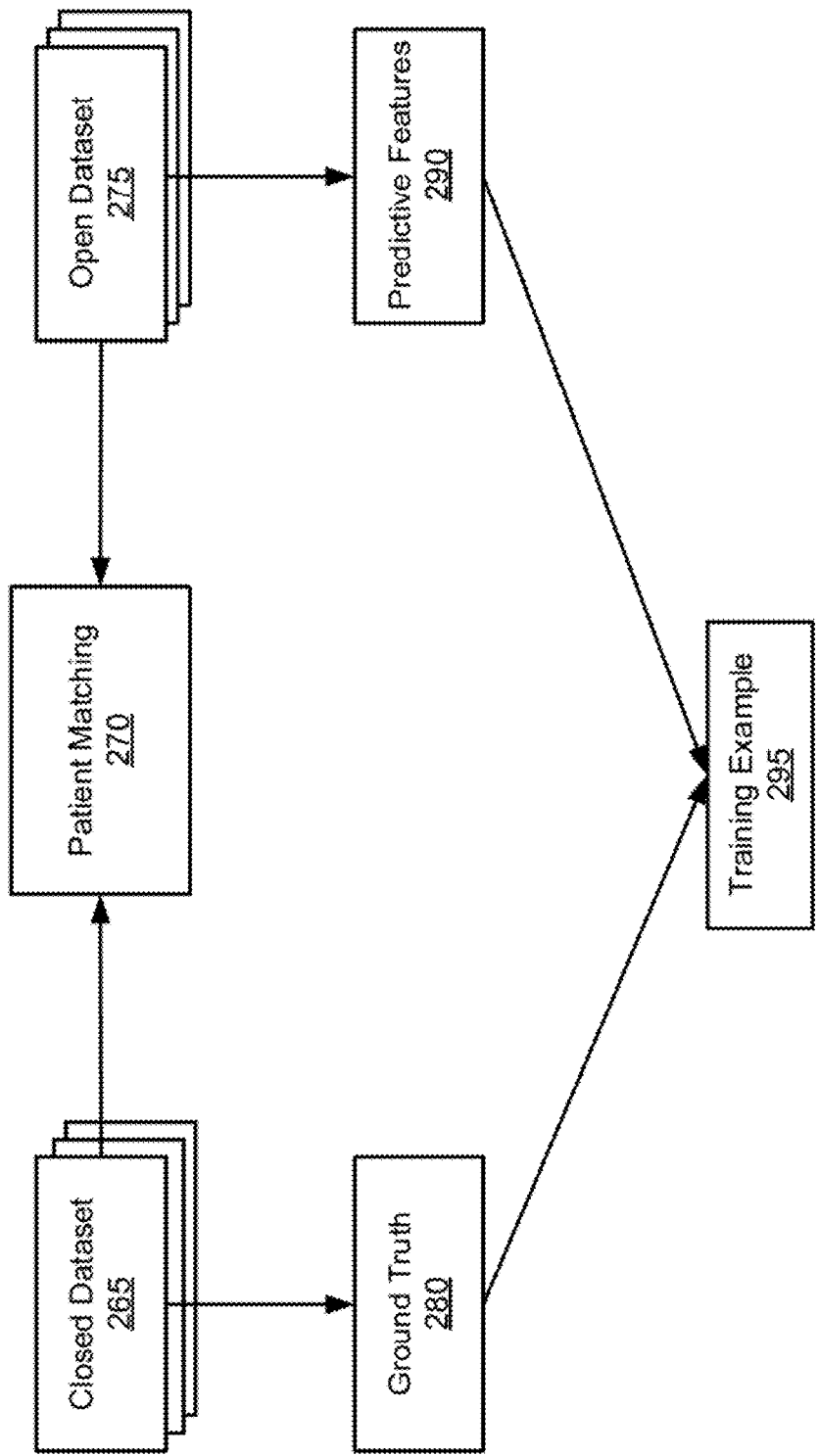
FIG. 2E depicts an example flow diagram for generating a training example for training a predictive model, in accordance with an embodiment.

FIG. 2E depicts an example flow diagram for generating a training example for training a predictive model, in accordance with an embodiment. Here, the closed dataset 265 and the open dataset 275 may be obtained from different sources. The closed dataset 265 is referred to herein as a training complete dataset. The open dataset 275 is also referred to herein as a training incomplete dataset. In various embodiments, there may be multiple closed datasets 265 corresponding to different subjects as well as open datasets 275 also corresponding to different subjects. As shown in FIG. 2E, a patient matching process 270 is performed to pair a closed dataset 265 with a corresponding open dataset 275, where the paired closed dataset 265 and open dataset 275 both correspond to the same subjects.

The closed dataset 265 is analyzed to determine a ground truth 280. As an example, the ground truth is a label indicating that the subject is eligible or ineligible for therapy. Here, the ground truth can be determined based on the subject data in the closed dataset 265, such as one or more lines of prior therapies that the subject has received. Alternatively, the ground truth can be determined based on the subject data in a superset generated from a combination of data from the open dataset 275 and the closed dataset 265. Additionally, the open dataset 275 is analyzed to determine predictive features 290. Here, the open dataset 275 is missing data points and/or features in comparison to the closed dataset 265 and therefore, the predictive features 290 can be informative for determining patient eligibility (e.g., ground truth 280) without the need for the missing data points and/or features. As shown in FIG. 2E, the ground truth 280 and the predictive features 290 are combined to generate a training example 295. In various embodiments, the process shown in FIG. 2E can be repeated across different subjects, thereby generating training examples across the different subjects. In various embodiments, the process shown in FIG. 2E can be repeated across different timeframes for a single subject, thereby generating training examples across the different timeframes for the single subject. Thus, the training examples 295 can be used to train a predictive model.

In various embodiments, the paired open dataset 275 and closed dataset 265 can be used to generate additional training incomplete datasets. For example, various pairings of a closed dataset 265 and the open dataset 275 can be compared to determine trends in which certain datapoints and/or features are typically missing in the open dataset 275 but present in the closed dataset 265. This can further guide the generation of additional training incomplete datasets. For example, as described above in reference to FIG. 2A, datapoints from a closed dataset can be selectively dropped to generate a modified dataset that represents an additional training incomplete dataset. Thus, the datapoints that are typically missing in the open dataset 275 but present in the closed dataset can serve as datapoints that are selectively dropped.

This method would be applied when the desired closed and open datasets are not matched. For example, in one scenario, a Komodo-Symphony matched dataset can be obtained. However, it is unlikely to obtain an IBM MarketScan-Symphony linked dataset. The patient-level difference in claims in Komodo-Symphony can be used to modify the IBM dataset to simulate data missingness in Symphony. Then the IBM/modified IBM dataset can be pooled with the Komodo-Symphony linked dataset to create a larger training dataset.

II.B. Training a Predictive Model

Referring again to FIG. 1B, the model training module 160 trains a predictive model. In various embodiments, the model training module 160 trains a predictive model for one or more sources that provide datasets (e.g., open datasets, closed datasets, and/or supersets). In various embodiments, the model training module 160 trains a predictive model for a first source that provides a dataset. Therefore, a predictive model trained for a particular source can be deployed to analyze additional datasets that are obtained from that source. For example, a predictive model can be trained and deployed to analyze datasets obtained from a specific pharmacy. Given that different sources can have differently structured datasets and/or different amounts of missing data (e.g., missing data in an open claims dataset), the predictive model trained for a particular source can adequately generate predictions based on datasets from that source. In various embodiments, the model training module 160 trains a predictive model using a dataset including data that is collected from multiple sources. For example, data from multiple data sources can be combined to create a dataset including training examples.

In various embodiments, the predictive model is structured such that it analyzes features extracted from an open claims dataset (e.g., a dataset with limited patient data) and predicts patient eligibility. Thus, the predictive model discriminates between whether a patient is eligible or ineligible based on features and/or datapoints available in an open claims dataset (which may be less than the features and/or datapoints available in a closed claims dataset).

In various embodiments, the predictive model is a machine learning model. In various embodiments, the predictive model is any one of a regression model (e.g., linear regression, logistic regression, or polynomial regression), decision tree, random forest, support vector machine, Naïve Bayes model, k-means cluster, or neural network (e.g., feed-forward networks, convolutional neural networks (CNN), deep neural networks (DNN), autoencoder neural networks, generative adversarial networks, or recurrent networks (e.g., long short-term memory networks (LSTM), bi-directional recurrent networks, deep bi-directional recurrent networks), or any combination thereof. In particular embodiments, the predictive model is a random forest classifier or a neural network.

The predictive model can be trained using a machine learning implemented method, such as any one of a linear regression algorithm, logistic regression algorithm, decision tree algorithm, support vector machine classification, Naïve Bayes classification, K-Nearest Neighbor classification, random forest algorithm, deep learning algorithm, gradient boosting algorithm, and dimensionality reduction techniques such as manifold learning, principal component analysis, factor analysis, autoencoder regularization, and independent component analysis, or combinations thereof. In various embodiments, the predictive model is trained using supervised learning algorithms, unsupervised learning algorithms, semi-supervised learning algorithms (e.g., partial supervision), weak supervision, transfer, multi-task learning, or any combination thereof. In particular embodiments, the predictive model is trained using supervised learning algorithms.

In various embodiments, the predictive model has one or more parameters, such as hyperparameters or model parameters. Hyperparameters are generally established prior to training. Examples of hyperparameters include the learning rate, depth or leaves of a decision tree, number of hidden layers in a deep neural network, number of clusters in a k-means cluster, penalty in a regression model, and a regularization parameter associated with a cost function. Model parameters are generally adjusted during training. Examples of model parameters include weights associated with nodes in layers of neural network, support vectors in a support vector machine, and coefficients in a regression model. The model parameters of the predictive model are trained (e.g., adjusted) using the training data to improve the predictive capacity of the predictive model.

The model training module 160 trains the predictive model using training data. The training data can be stored and/or retrieved from training data store 170. In various embodiments, the training data includes individual training examples corresponding to individual subjects. In various embodiments, the training data includes 1) features extracted from the open dataset (or modified closed dataset that has been modified to mimic the open dataset) and 2) a reference ground truth determined from the closed dataset.

In various embodiments, the reference ground truths indicate whether subjects are eligible or ineligible based on the comprehensive patient data that is available in the closed datasets and/or superset. In various embodiments, the reference ground truths in the training data are binary values, such as "1" or "0." For example, a reference ground truth for an eligible patient can be identified in the training data with a value of "1" whereas a reference ground truth for an ineligible patient can be identified in the training data with a value of "0."

Altogether, the model training module 160 trains the predictive model using the training data to minimize a loss function such that the predictive model can better predict an outcome (e.g., patient eligibility) based on the input (e.g., extracted features from open dataset (or modified closed dataset)) fed to the predictive model. In various embodiments, the loss function is constructed for any of a least absolute shrinkage and selection operator (LASSO) regression, Ridge regression, or ElasticNet regression.

III. Example Method for Determining Patient Eligibility

Figure 3:
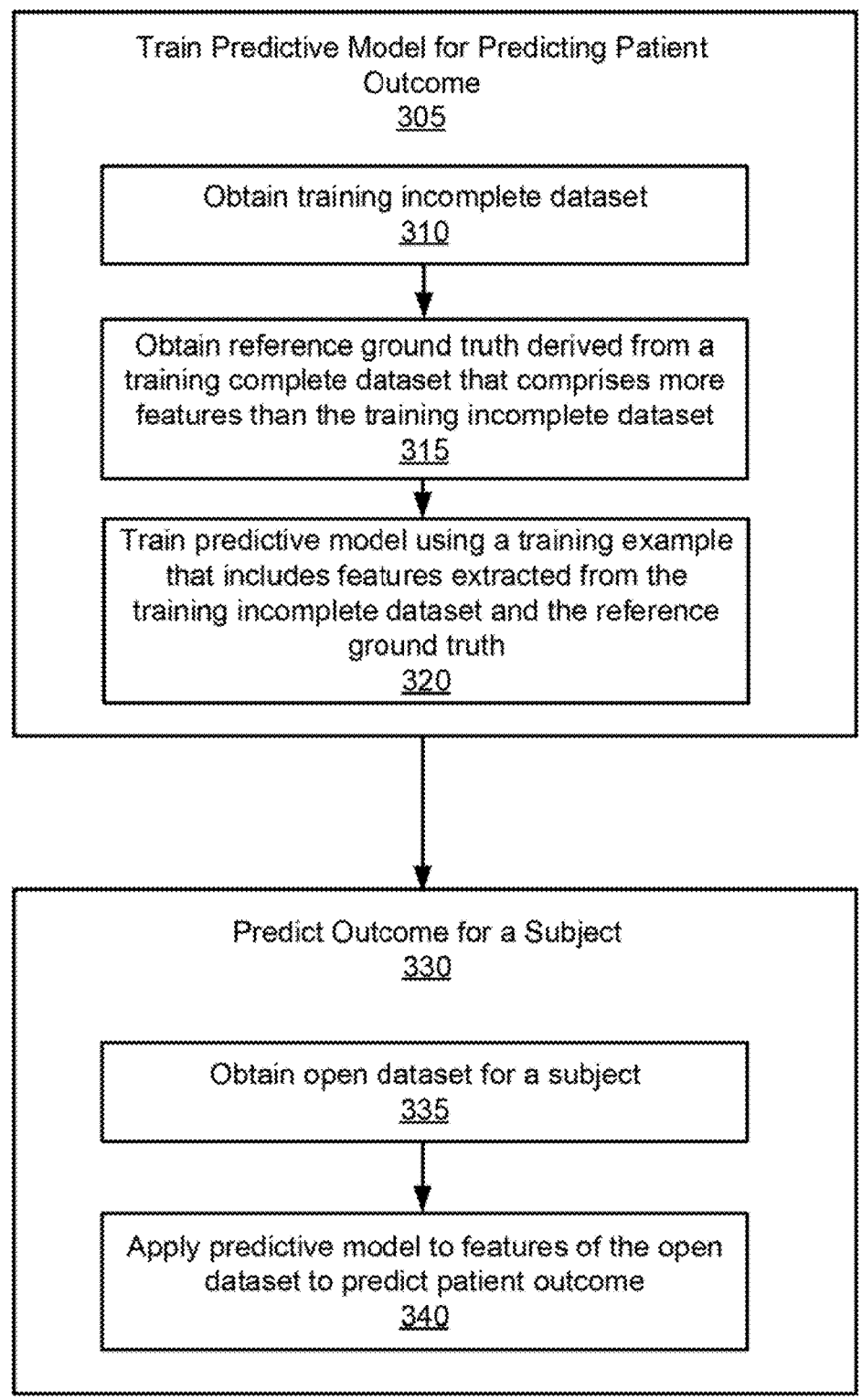
FIG. 3 depicts an example flow process for training and deploying a predictive model for predicting a patient outcome, in accordance with an embodiment.

FIG. 3 depicts an example flow process for training and deploying a predictive model for predicting patient eligibility, in accordance with an embodiment. Generally, FIG. 3 shows the separate steps of training a predictive model (e.g., step 305) and deploying the model to predict eligibility for a subject (e.g., step 330). Here, the step of training the predictive model (step 305) precedes the step of deploying the model to predict eligibility for the subject (step 330). In various embodiments, step 305 of training the predictive model can be performed by a different party than the party that performs step 330. In various embodiments, both steps 305 and 330 are performed by the same party.

As shown in FIG. 3, step 305 of training the predictive model includes steps 310, 315, and 320. Specifically, step 310 involves obtaining a training incomplete dataset. Here, the training incomplete dataset can refer to a modified closed dataset (e.g., a closed dataset that has been modified by dropping features and/or data points to mimic an open dataset) or it can refer to an open dataset itself. Step 315 involves obtaining reference ground truths that are derived from a training complete dataset that comprises more features and/or datapoints than the training incomplete dataset. Here, the training complete dataset may be a superset or a closed dataset that includes comprehensive data for the patient and therefore, includes more features and/or datapoints than a training incomplete dataset that is missing data for the patient. Step 320 involves training the predictive model using training examples that include features extracted from the training incomplete dataset and the reference ground truth. Here, the predictive model can be trained over many training examples to further improve the predictive capacity of the predictive model.

As shown in FIG. 3, step 330 of predicting the eligibility of a subject involves steps 335 and 340. Step 335 involves obtaining an open claims dataset for the subject. Here, the open claims dataset is used given that open claims datasets are more readily accessible and obtainable and typically includes more patients in comparison to closed claims datasets, thus giving access to bigger cohort sizes. In various embodiments, the open claims dataset is a healthcare claims dataset. Step 340 involves applying the trained predictive model to features extracted from the open dataset to predict the patient eligibility. Thus, the patient eligibility can be used to guide the care or treatment of the patient.

IV. Cancer Patients and Therapeutics

Methods described herein involve determining eligibility of a patient for receiving a therapy. For example, determining the eligibility of the patient can involve training and deploying a predictive model for predicting the eligibility of the patient. In various embodiments, the patient is a cancer patient. In various embodiments, the cancer in the subject can include one or more of: lymphoma, B cell lymphoma, T cell lymphoma, mycosis fungoides, Hodgkin's Disease, myeloid leukemia, bladder cancer, brain cancer, nervous system cancer, head and neck cancer, squamous cell carcinoma of head and neck, kidney cancer, lung cancer, neuroblastoma/glioblastoma, ovarian cancer, pancreatic cancer, prostate cancer, skin cancer, liver cancer, melanoma, squamous cell carcinomas of the mouth, throat, larynx, and lung, colon cancer, cervical cancer, cervical carcinoma, breast cancer, and epithelial cancer, renal cancer, genitourinary cancer, pulmonary cancer, esophageal carcinoma, stomach cancer, thyroid cancer, head and neck carcinoma, large bowel cancer, hematopoietic cancer, testicular cancer, colon and/or rectal cancer, uterine cancer, or prostatic cancer. In some embodiments, the cancer in the subject can be a metastatic cancer, including any one of bladder cancer, breast cancer, colon cancer, kidney cancer, lung cancer, melanoma, ovarian cancer, pancreatic cancer, prostatic cancer, rectal cancer, stomach cancer, thyroid cancer, or uterine cancer. In particular embodiments, the cancer is multiple myeloma. In particular embodiments, the cancer is relapsed multiple myeloma. In particular embodiments, the cancer is refractory multiple myeloma.

In various embodiments, methods described herein involve determining eligibility of a patient to receive a CAR-T therapy. In various embodiments, the CAR-T therapy is an FDA-approved CAR-T therapy. In various embodiments, the CAR-T therapy is any one of ABECMA (idecabtagene vicleucel), BREYANZI, TECARTUS, KYMRIAH, YESCARTA, or CARVYKTI.

In various embodiments, the CAR-T therapy is formulated as a pharmaceutical composition. The compositions can also include various other agents to enhance delivery and efficacy, e.g., to enhance delivery and stability of the active ingredients. Thus, for example, the compositions can also include, depending on the formulation desired, pharmaceutically acceptable, non-toxic carriers or diluents, which are defined as vehicles commonly used to formulate pharmaceutical compositions for animal or human administration. The diluent is selected so as not to affect the biological activity of the combination. Examples of such diluents are distilled water, buffered water, physiological saline, PBS, Ringer's solution, dextrose solution, and Hank's solution. In addition, the pharmaceutical composition or formulation can include other carriers, adjuvants, or non-toxic, nontherapeutic, nonimmunogenic stabilizers, excipients and the like. The compositions can also include additional substances to approximate physiological conditions, such as pH adjusting and buffering agents, toxicity adjusting agents, wetting agents and detergents. The composition can also include any of a variety of stabilizing agents, such as an antioxidant.

The pharmaceutical compositions described herein can be administered in a variety of different ways. Examples include administering a composition containing a pharmaceutically acceptable carrier via oral, intranasal, rectal, topical, intraperitoneal, intravenous, intramuscular, subcutaneous, subdermal, transdermal, intrathecal, or intracranial method.

Such a pharmaceutical composition may be administered for treatment purposes, e.g., after diagnosing a patient with cancer). Preventing, prophylaxis or prevention of a disease or disorder as used in the context of this invention refers to the administration of a composition to prevent the occurrence, onset, progression, or recurrence of cancer at least some of the symptoms of cancer or to lessen the likelihood of the onset of cancer. Treating, treatment, or therapy of cancer shall mean slowing, stopping or reversing the cancer's progression by administration of treatment according to the present invention. In an exemplary embodiment, treating cancer means reversing the cancer's progression, ideally to the point of eliminating the cancer itself.

V. Example CAR-T Therapy

Generally, a chimeric antigen receptor (CAR) is designed for a cell, such as an immune cell (e.g., a T cell, a B cell, an NK cell, an NKT cell, a CD4 cell) and is a chimera of a signaling domain of the T-cell receptor (TCR) complex and an antigen-recognizing domain (e.g., a single chain fragment (scFv) of an antibody) (Enblad et al., Human Gene Therapy. 2015; 26(8):498-505). Examples of CAR-T therapies include any of ABECMA (idecabtagene vicleucel), BREYANZI, TECARTUS, KYMRIAH, YESCARTA, or CARVYKTI.

Generally, a CAR refers to a recombinant polypeptide construct comprising at least an extracellular antigen-binding domain, a transmembrane domain and a cytoplasmic signaling domain (also referred to herein as "an intracellular signaling domain") comprising a functional signaling domain derived from a stimulatory molecule. In one aspect, the stimulatory molecule is the zeta chain associated with the T cell receptor complex. In one aspect, the cytoplasmic signaling domain comprises a primary signaling domain (e.g., a primary signaling domain of CD3-zeta). In one aspect, the cytoplasmic signaling domain further comprises one or more functional signaling domains derived from at least one costimulatory molecule as defined below. In one aspect, the costimulatory molecule is chosen from 4-1BB (i.e. CD 137), CD27, ICOS, and/or CD28. In one aspect, the CAR comprises a chimeric fusion protein comprising an extracellular antigen-binding domain, a transmembrane domain and an intracellular signaling domain comprising a functional signaling domain derived from a stimulatory molecule. In one aspect, the CAR comprises a chimeric fusion protein comprising an extracellular antigen-binding domain, a transmembrane domain and an intracellular signaling domain comprising a functional signaling domain derived from a co-stimulatory molecule and a functional signaling domain derived from a stimulatory molecule.

The extracellular antigen binding domain refers to a molecular binding domain which is typically an ectodomain of a cell receptor and is located outside the cell, exposed to the extracellular space. An extracellular antigen binding domain can include any molecule (e.g., protein or peptide) capable of binding to another protein or peptide. In some embodiments, an extracellular antigen binding domain comprises an antibody, an antigen-binding fragment thereof, F(ab), F(ab)'), a single chain variable fragment (scFv), or a single-domain antibody (sdAb). In some embodiments, an extracellular antigen binding domain binds to a hormone, a growth factor, a cell-surface ligand (e.g., an antigen, such as a cancer antigen), or the extracellular matrix. An antibody refers to a protein, or polypeptide sequence derived from an immunoglobulin molecule which specifically binds with an antigen. Antibodies can be polyclonal or monoclonal, multiple or single chain, or intact immunoglobulins, and may be derived from natural sources or from recombinant sources. Antibodies can be tetramers of immunoglobulin molecules. An antibody fragment refers to at least one portion of an intact antibody, or recombinant variants thereof, and refers to the antigen-binding domain, e.g., an antigenic determining variable region of an intact antibody, that is sufficient to confer recognition and specific binding of the antibody fragment to a target, such as an antigen. Examples of antibody fragments include, but are not limited to, Fab, Fab', F(ab')2, and Fv fragments, scFv antibody fragments, linear antibodies, single domain antibodies such as sdAb (either VL or VH), camelid VHH domains, and multi-specific antibodies formed from antibody fragments such as a bivalent fragment comprising two Fab fragments linked by a disulfide bridge at the hinge region, and an isolated CDR or other epitope binding fragments of an antibody. An antigen binding fragment can also be incorporated into single domain antibodies, maxibodies, minibodies, nanobodies, intrabodies, diabodies, triabodies, tetrabodies, v-NAR and bis-scFv (see, e.g., Hollinger and Hudson, Nature Biotechnology 23: 1126-1136, 2005). In various embodiments, the extracellular antigen binding domain binds to CD19. In various embodiments, the extracellular antigen binding domain binds to BCMA.

The intracellular signaling domain refers to the functional portion of a protein which acts by transmitting information within the cell to regulate cellular activity via defined signaling pathways by generating second messengers or functioning as effectors by responding to such messengers. In some embodiments, the signaling domain of a chimeric receptor of the present disclosure is derived from a stimulatory molecule or co-stimulatory molecule described herein, or is a synthesized or engineered signaling domain. In some embodiments, the signaling domain is a CD3 zeta protein, which includes three immunoreceptor tyrosine-based activation motifs (ITAMs). Other examples of signaling domains include CD28, 4-1BB, and OX40. In some embodiments, a cell receptor comprises more than one signaling domain, each referred to as a co-signaling domain.

The transmembrane domain refers to a domain that spans a cellular membrane. In some embodiments, a transmembrane domain comprises a hydrophobic alpha helix. Different transmembrane domains result in different receptor stability. In some embodiments, a transmembrane domain of a cell receptor of the present disclosure comprises a CD3-zeta transmembrane domain or a CD28 transmembrane domain.

VI. Computer Implementation

The methods of the invention, including the methods for training and deploying a predictive model for predicting patient eligibility, are, in some embodiments, performed on one or more computers.

For example, the training and deploying of a predictive model for predicting patient eligibility can be implemented in hardware or software, or a combination of both. In one embodiment of the invention, a machine-readable storage medium is provided, the medium comprising a data storage material encoded with machine readable data which, when using a machine programmed with instructions for using said data, is capable of displaying any of the datasets and execution and results of the models described herein. The invention can be implemented in computer programs executing on programmable computers, comprising a processor, a data storage system (including volatile and non-volatile memory and/or storage elements), a graphics adapter, a pointing device, a network adapter, at least one input device, and at least one output device. A display is coupled to the graphics adapter. Program code is applied to input data to perform the functions described above and generate output information. The output information is applied to one or more output devices, in known fashion. The computer can be, for example, a personal computer, microcomputer, or workstation of conventional design.

Each program can be implemented in a high-level procedural or object-oriented programming language to communicate with a computer system. However, the programs can be implemented in assembly or machine language, if desired. In any case, the language can be a compiled or interpreted language. Each such computer program is preferably stored on a storage media or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

The signature patterns and databases thereof can be provided in a variety of media to facilitate their use. "Media" refers to a manufacture that contains the signature pattern information of the present invention. The databases of the present invention can be recorded on computer readable media, e.g., any medium that can be read and accessed directly by a computer. Such media include, but are not limited to the following: magnetic storage media, such as floppy discs, hard disc storage medium, and magnetic tape; optical storage media such as CD-ROM; electrical storage media such as RAM and ROM; and hybrids of these categories such as magnetic/optical storage media. One of skill in the art can readily appreciate how any of the presently known computer readable mediums can be used to create a manufacture comprising a recording of the present database information. "Recorded" refers to a process for storing information on computer readable medium, using any such methods as known in the art. Any convenient data storage structure can be chosen, based on the means used to access the stored information. A variety of data processor programs and formats can be used for storage, e.g., word processing text file, database format, etc.

In some embodiments, the methods of the invention, including the methods for training and deploying a predictive model for generating a health-based prediction, are performed on one or more computers in a distributed computing system environment (e.g., in a cloud computing environment). In this description, "cloud computing" is defined as a model for enabling on-demand network access to a shared set of configurable computing resources. Cloud computing can be employed to offer on-demand access to the shared set of configurable computing resources. The shared set of configurable computing resources can be rapidly provisioned via virtualization and released with low management effort or service provider interaction, and then scaled accordingly. A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 4:
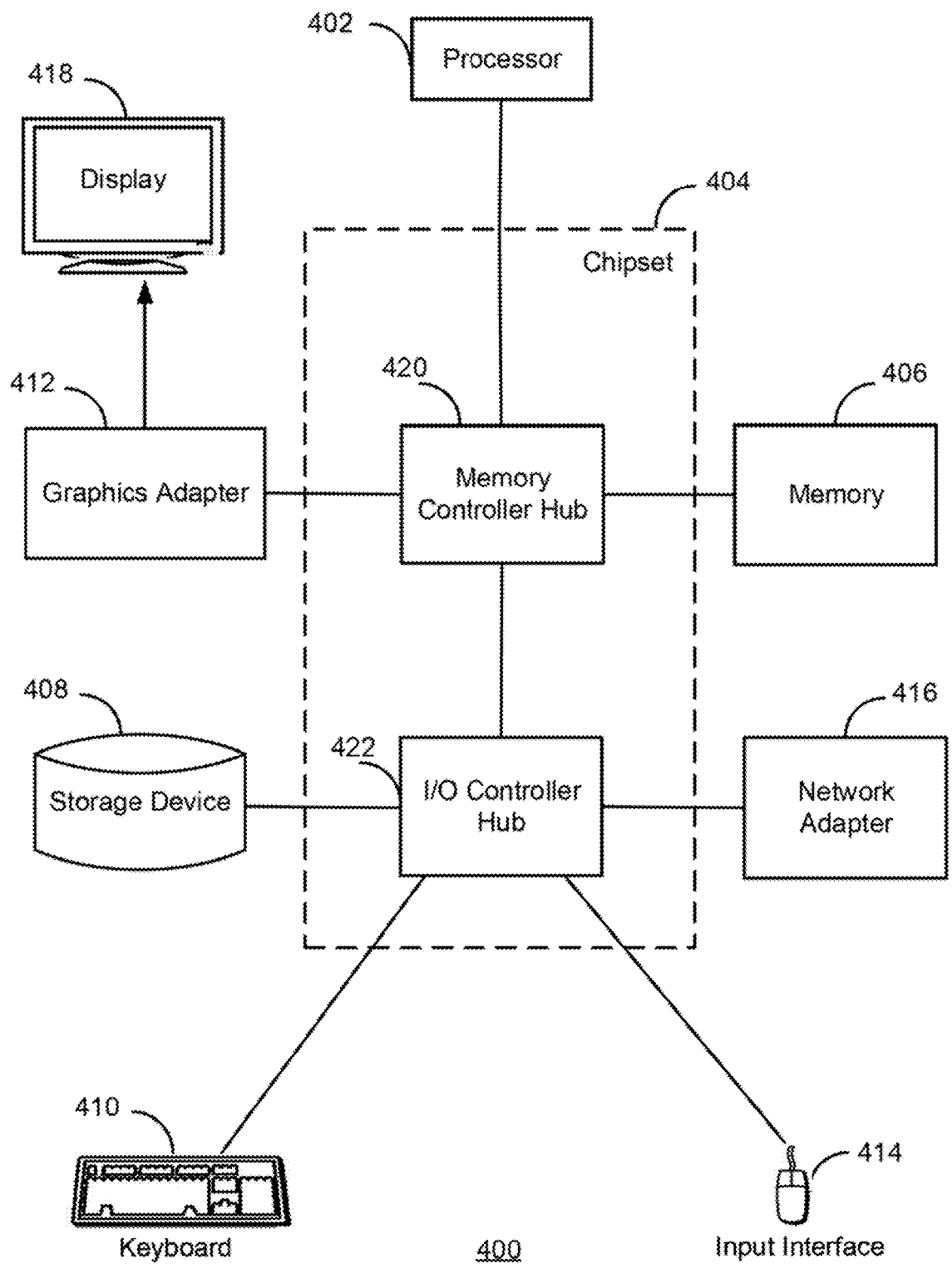
FIG. 4 illustrates an example computer for implementing the entities shown in FIGS. 1A-1B, 2A-2E, and 3.

FIG. 4 illustrates an example computer for implementing the entities shown in FIGS. 1A-1B, 2A-2E, and 3. The computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, an input device 414, and network adapter 416 are coupled to the I/O controller hub 422. Other embodiments of the computer 400 have different architectures.

The storage device 408 is a non-transitory computer-readable storage medium such as a hard drive, compact disk read-only memory (CD-ROM), DVD, or a solid-state memory device. The memory 406 holds instructions and data used by the processor 402. The input interface 414 is a touch-screen interface, a mouse, track ball, or other type of pointing device, a keyboard, or some combination thereof, and is used to input data into the computer 400. In some embodiments, the computer 400 may be configured to receive input (e.g., commands) from the input interface 414 via gestures from the user. The graphics adapter 412 displays images and other information on the display 418. The network adapter 416 couples the computer 400 to one or more computer networks.

The computer 400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 408, loaded into the memory 406, and executed by the processor 402.

The types of computers 400 used by the entities of FIG. 1A or 1B can vary depending upon the embodiment and the processing power required by the entity. For example, the subject prediction system 130 can run in a single computer 400 or multiple computers 400 communicating with each other through a network such as in a server farm. The computers 400 can lack some of the components described above, such as graphics adapters 412, and displays 418.

Below are examples of specific embodiments for carrying out the present invention. The examples are offered for illustrative purposes only and are not intended to limit the scope of the present invention in any way. Efforts have been made to ensure accuracy with respect to numbers used, but some experimental error and deviation should be allowed for.

FIG. 5 depicts example closed and open datasets for an individual patient. Specifically, FIG. 5 shows a closed dataset 502 that includes comprehensive data for a patient (illustrated as healthcare events along a timeline; Diag=diagnosis, Rx=prescription drug, Proc=procedure). In contrast, data is missing for a patient in open data set 504. Generally, the closed dataset 502 can be sourced from insurance plans and payers and contains complete claims data during a patient's period of enrollment with a specific insurance plan. In contrast, the open dataset 504 can be sourced from points of transactions e.g., doctor's offices, hospitals, pharmacies, and clearinghouses, or software platforms other than a health insurance provider. However, open datasets, although generally more abundant and available than closed datasets, can be missing data because of limitations of "in network" sources or claims blocked by specific parties (e.g., drug manufacturers or distributors). In various embodiments, a superset (as described in FIG. 9 below) may be generated from a combination of data from the closed dataset 502 and the open dataset 504. For example, a superset may be generated from a union of data points from an open dataset and a closed dataset.

Figure 6:
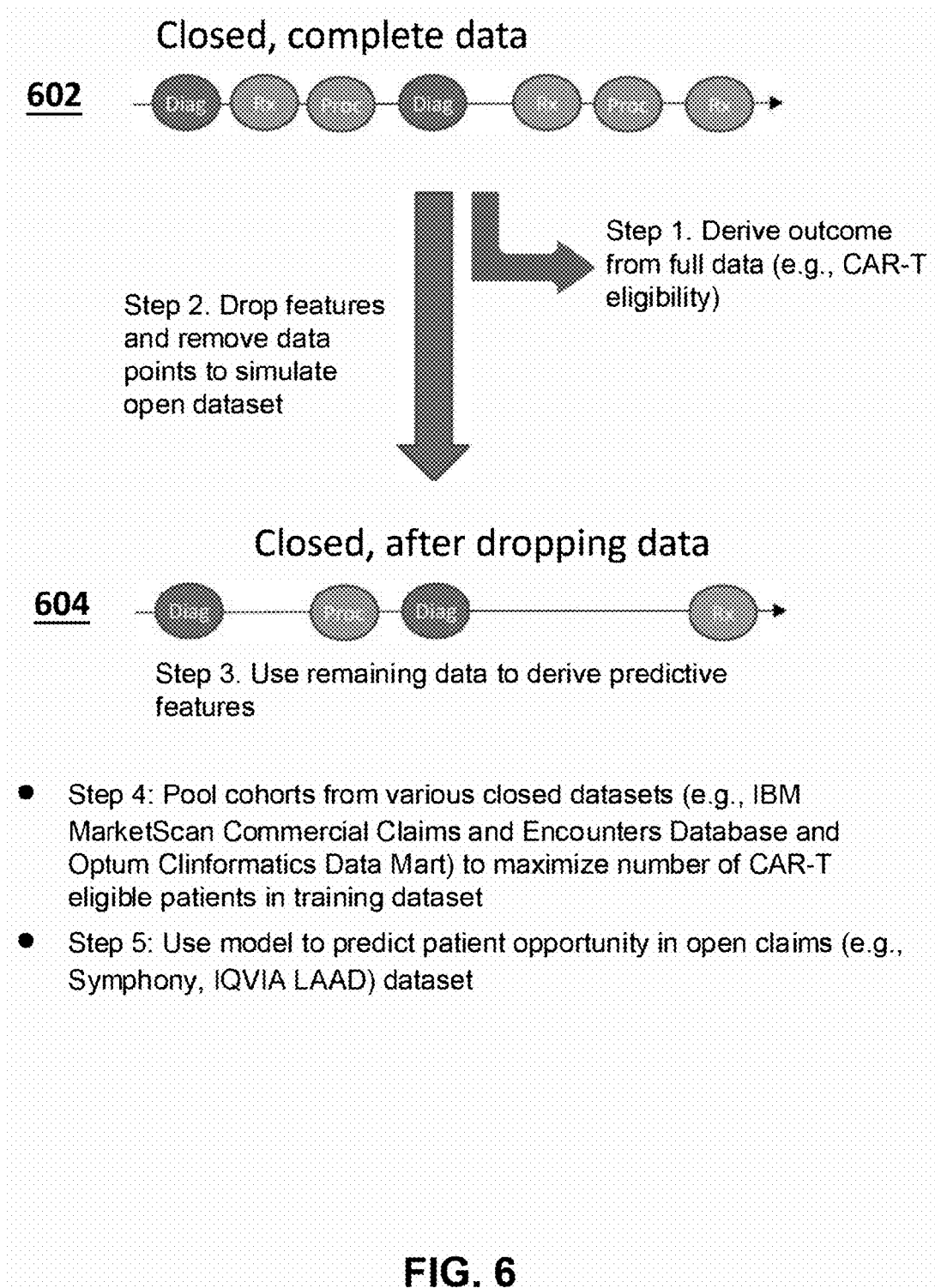
FIG. 6 depicts an example process for training and deploying a predictive model in accordance with the flow diagram of FIG. 2A.

FIG. 6 depicts an example process for training and deploying a predictive model in accordance with the flow diagram of FIG. 2A. Here, FIG. 6 begins with a first dataset shown as a closed dataset 602. Here, the first dataset includes comprehensive/complete data for patients. Examples of the first dataset can be closed claims datasets such as IBM MarketScan Commercial Claims and Encounters Database, Optum Clinformatics Data Mart, or other closed claims datasets sourced from a health insurance provider, insurance plans, or payers. Step 1 involves deriving a relevant outcome (e.g., CAR-T eligibility) from the full data in the first dataset. Given that the first dataset includes comprehensive patient data, it enables the determination of the relevant patient outcome.

Step 2 involves dropping features and/or data points from the closed dataset to simulate the data missingness that is typically present in open datasets. For example, the dropping of features and/or data points is selected such that the resulting dataset 604 (e.g., labeled as "Closed, after dropping data" in FIG. 6) shares one or more features with features that are traditionally in a target dataset. For example, a target dataset may be an open claims dataset such as Symphony Health Integrated DataVerse, IQVIA Longitudinal Access and Adjudication Data, or other open claims datasets sourced from points of transactions including doctor's offices, hospitals, clearinghouses, pharmacies, or software platforms other than a health insurance provider. In essence, features and/or data points are dropped from the closed dataset such that the closed dataset more closely resembles the target dataset.

Step 3 involves using the remaining data in the closed dataset to derive predictive features. Here, together, the predictive features derived from Step 3 and the derived relevant outcome from Step 1 form a training example. Such a training example may correspond to a single patient. Step 4 involves pooling cohorts from various closed datasets to increase the number of patients in the training dataset. In other words, the process shown in FIG. 6 can be performed many times to generate training examples across a plurality of patients.

The training examples are used to train a predictive model. Here, the predictive model is trained to recognize patterns or relationships between the features derived from the open dataset, and the relevant outcome (e.g., CAR-T eligibility). Thus, the predictive model can be further deployed in Step 5 on additional open datasets (e.g., the full Symphony dataset) to predict an outcome (e.g., whether patients are eligible or not eligible for CAR-T therapy).

Figure 7:
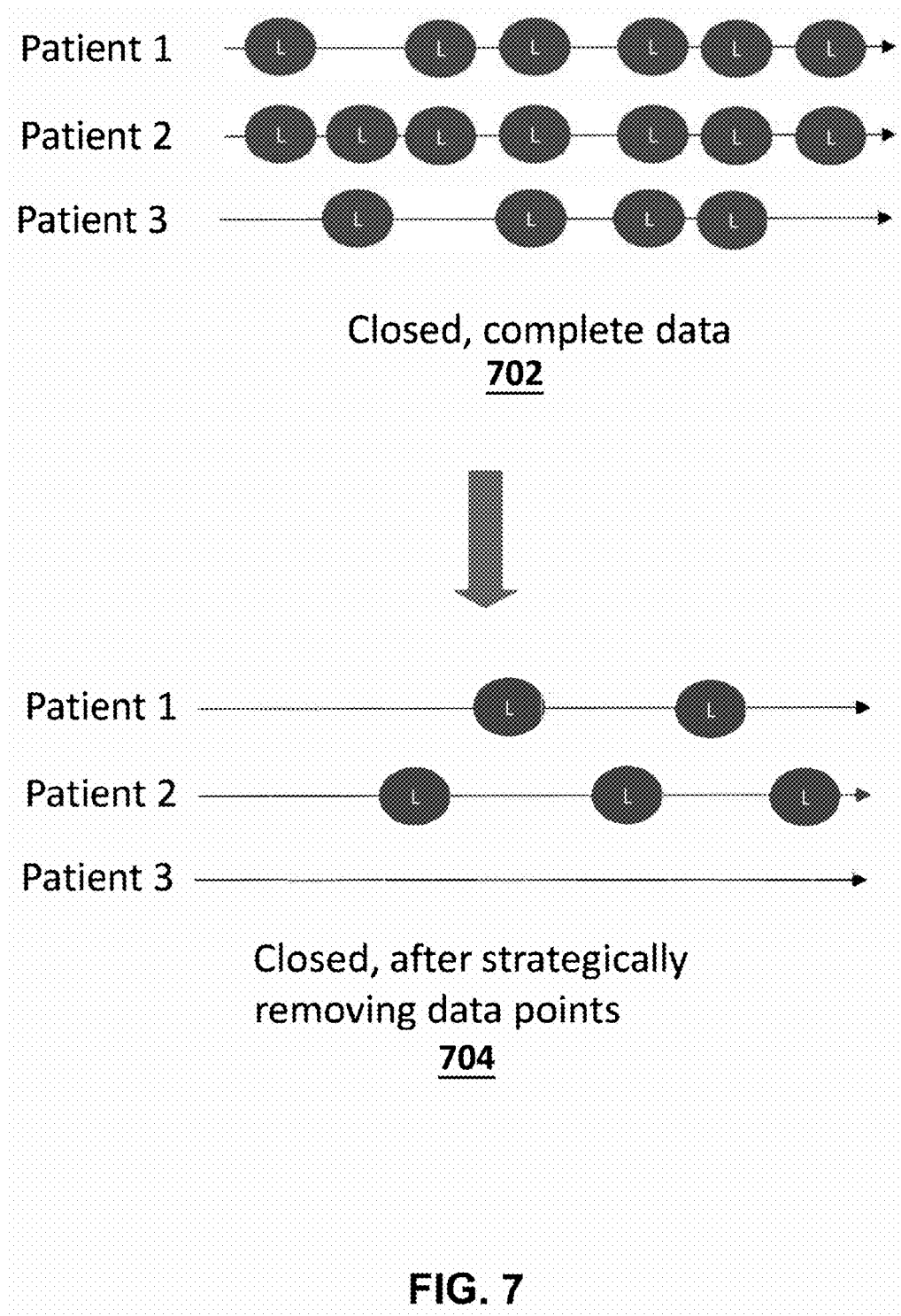
FIG. 7 depicts an example closed dataset before and after dropping of data to simulate data missingness of an open dataset.

FIG. 7 depicts an example closed dataset before and after dropping data to simulate data missingness of an open dataset. First, the study population in both the open dataset and the closed dataset is defined. This can involve continuous enrollment in the closed dataset to ensure completeness of data. Then, entire features in the closed dataset that are unavailable in open data are dropped. The distribution of claims for products of interest in both datasets is determined. Next, remove data points from the closed dataset to resemble missingness/distribution in the open dataset. For example, as shown in FIG. 7, the closed dataset 702 may include many datapoints for drug L. After strategically removing datapoints, patients in the modified closed dataset 704 have reduced or no claims for drug L. Doing so ensures that the model can generate predictions in subsequent open datasets.

Figure 8:
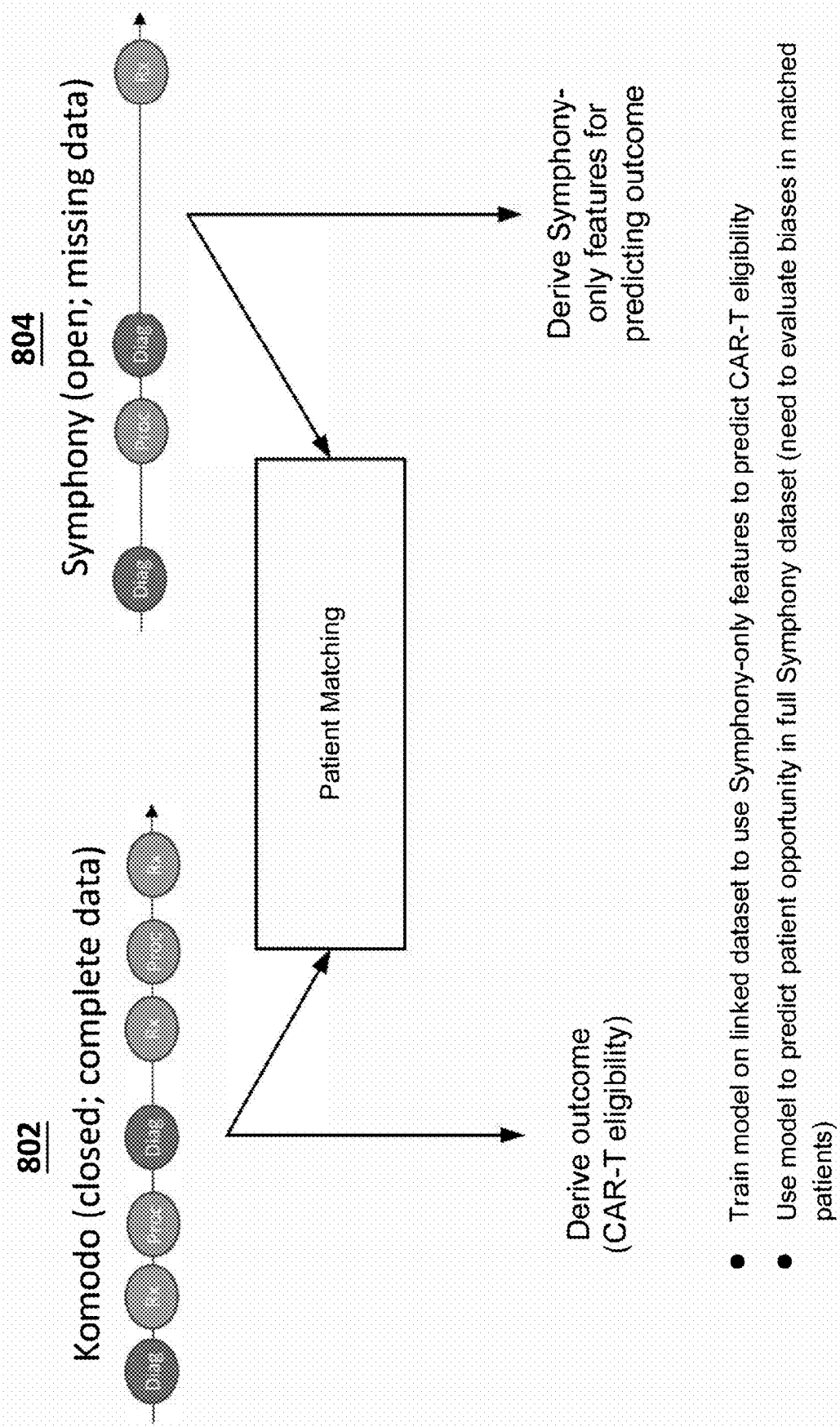
FIG. 8 depicts an example process for training and deploying a predictive model in accordance with the flow diagram of FIG. 2E.

FIG. 8 depicts an example process for training a predictive model in accordance with the flow diagram of FIG. 2E. Here, FIG. 8 depicts two separate datasets. The first dataset is a closed dataset that includes comprehensive/complete data for patients. Here, the first dataset in FIG. 8 is the Komodo closed dataset 802 (e.g., closed dataset obtained from Komodo Health). Other examples of the first dataset can be closed claims datasets such as IBM MarketScan Commercial Claims and Encounters or Optum Clinformatics Data Mart or other closed claims datasets sourced from health insurance providers, insurance plans, or payers. FIG. 8 further depicts a second dataset, which is an open dataset which is missing certain data for patients. Here, the second dataset in FIG. 8 is the Symphony dataset 804 (e.g., obtained from Symphony Health). Other examples of the second dataset can be IQVIA Longitudinal Access and Adjudication Data or other open claims datasets sourced from points of transactions including doctor's offices, hospitals, clearinghouses, pharmacies, or software platforms other than a health insurance provider.

FIG. 8 shows a patient matching between the closed dataset and the open dataset. Specifically, data originating or corresponding to a single patient in each of the open and closed datasets are organized and labeled as corresponding to the single patient. This is performed across a plurality of patients.

The closed dataset is analyzed to derive the relevant outcome, which is also referred to as the reference ground truth for training the predictive model. Here in FIG. 8, the relevant outcome is CAR-T eligibility (e.g., eligibility of a patient to receive a CAR-T therapy). The open dataset is analyzed to derive features that are predictive for the relevant outcome. Here, individual training examples for individual patients are generated. For example, a training example includes the relevant outcome for the patient (e.g., eligible to receive CAR-T therapy or not eligible to receive CAR-T therapy) as well as the values of features derived from the open dataset that corresponds to that patient.

The training examples are used to train a predictive model. Here, the predictive model is trained to recognize patterns or relationships between the features derived from the open dataset, and the relevant outcome (e.g., CAR-T eligibility). Thus, the predictive model can be further deployed on additional open datasets (e.g., the full Symphony dataset) to predict patient opportunities for providing a treatment e.g., CAR-T therapy. The predictive model outputs predictions of whether patients are eligible or not eligible for CAR-T therapy.

Figure 9:
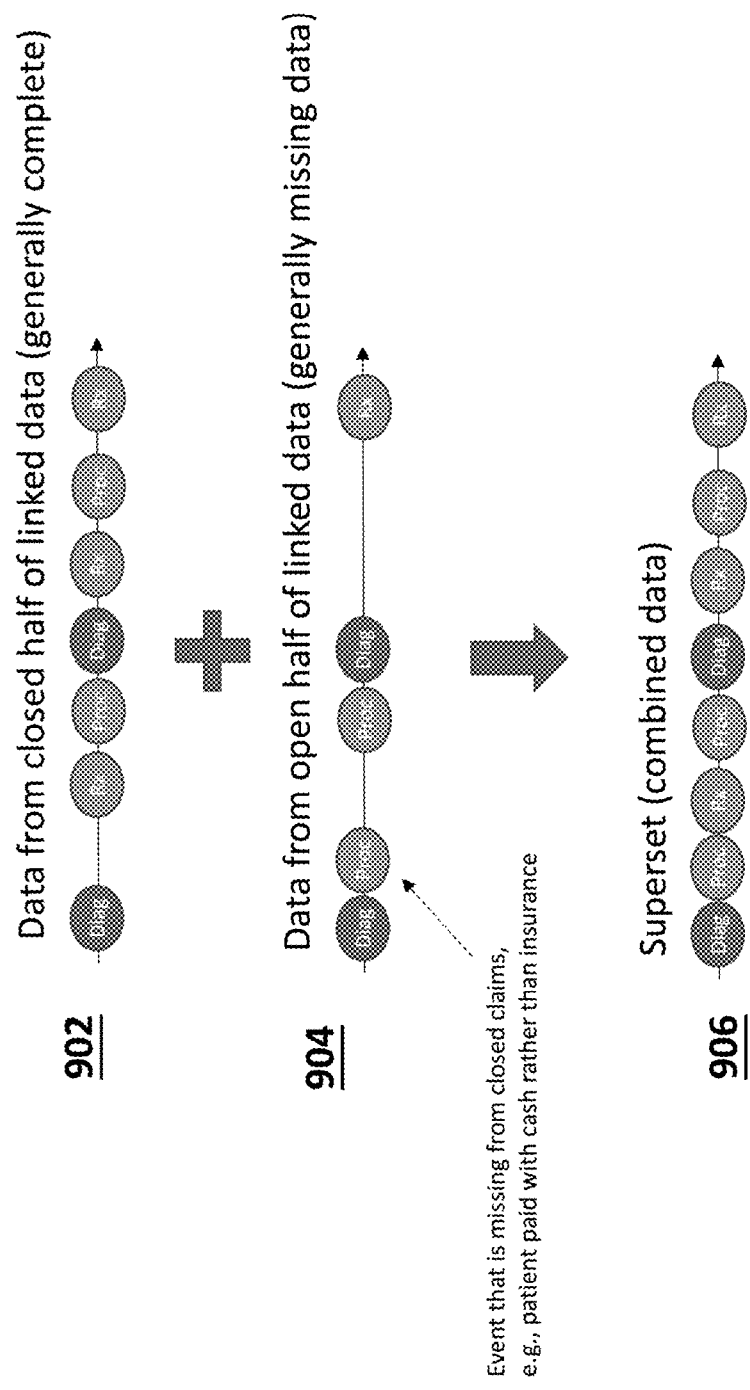
FIG. 9 depicts the generation of a superset from a closed dataset and an open dataset, in accordance with an embodiment.

FIG. 9 depicts the generation of a superset from a closed dataset and an open dataset, in accordance with an embodiment. A superset may be generated from a combination of data from an open dataset and a closed dataset and used to derive the ground truth label in a training example or the predictive features used to train a predictive model. For example, a superset may be generated from a union of data points from an open dataset and a closed dataset. In FIG. 9, data from a closed half of a linked dataset 902 (generally a complete dataset) is combined with data from an open half of a linked dataset 904 (generally a dataset with missing data). In certain instances, the closed dataset may contain events/data not present in the open dataset, and vice versa. For example, the open half of a linked dataset 904 includes an event (e.g., a procedure for which the patient paid with cash rather than insurance) that is missing from the closed half of a linked dataset 902. Therefore, a superset 906 may be generated from an intersection of data points from an open dataset and a closed dataset to capture the combined data from a linked dataset.

FIG. 10 depicts example scenarios for training a machine learning model in accordance with an embodiment. In a first scenario, as exemplified by FIG. 2A, an open dataset is used as the target dataset for deploying the predictive model. A closed dataset is used as the source for ground truth, and a modified version of the closed dataset (with data points selectively removed to simulate the missing data of an open dataset) is used as the source for predictive features to train the machine learning model. In this scenario, the datasets are not linked. In a second scenario, as exemplified by FIG. 2E, an open dataset is used as the target dataset for deploying the predictive model. A closed half of a linked dataset is used as the source for ground truth, and an open half of the linked dataset is used as the source for predictive features to train the machine learning model. In this scenario, patients must have data in both halves of the linked dataset. In a third scenario, a linked dataset is used as the target dataset for deploying the predictive model. A superset, as exemplified by FIG. 9 above, is used as the source for ground truth and as the source for predictive features to train the machine learning model. In this scenario, patients must have data in at least the closed half of the linked dataset, but patients do not need to have data in the open half of the linked dataset. In a fourth scenario, an open dataset is used as the target dataset for deploying the predictive model. A superset, as exemplified by FIG. 9 above, is used as the source for ground truth, and an open half of the linked dataset is used as the source for predictive features to train the machine learning model. In this scenario, patients must have data in both halves of the linked dataset.

All publications, patents, patent applications and other documents cited in this application are hereby incorporated by reference in their entireties for all purposes to the same extent as if each individual publication, patent, patent application or other document were individually indicated to be incorporated by reference for all purposes.

While various specific embodiments have been illustrated and described, the above specification is not restrictive. It will be appreciated that various changes can be made without departing from the spirit and scope of the present disclosure(s). Many variations will become apparent to those skilled in the art upon review of this specification.

What is claimed is:

1. A computer-implemented method comprising:
    obtaining or having obtained a first dataset comprising patient data for one or more patients, wherein the first dataset is obtained from a first source of patient datasets that are missing data in comparison to second patient datasets from a second source;
    deriving a training incomplete dataset of patient data from a training complete dataset of patient data by applying one or more random selection algorithms to each data point across the training complete dataset to extract features from the training complete dataset corresponding to one or more features of the obtained first dataset, and selectively dropping or transforming one or more valid data points from the training complete dataset based on a statistical distribution constraint corresponding to values of the one or more valid data points to create a subset of valid data points, the derived training incomplete dataset having the extracted features corresponding to the one or more features of the obtained first dataset and the subset of valid data points, the subset of valid data points comprising fewer features or fewer data points than the training complete dataset;
    identifying selected predictive features of patient data from the training incomplete dataset without the one or more valid data points dropped or transformed from the training complete dataset;
    deriving a ground truth label comprising an outcome corresponding to the selected predictive features of the patient data;
    creating an input training dataset comprising the selected features of the training incomplete patient dataset and the ground truth label;
    training a machine learning model using the input training dataset;
    applying the trained machine learning model to the obtained first dataset for at least one of the one or more patients to generate a calculated outcome indication; and
    taking an action with respect to at least one of the one or more patients based at least on the calculated outcome indication.

2. The method of claim 1, wherein each of the training incomplete dataset and the training complete dataset comprise healthcare-related patient-level data that is generated by transforming healthcare-related claim-level data.

3. The method of claim 1, wherein the training incomplete dataset and the training complete dataset each include data for at least 50 features, at least 100 features, at least 200 features, at least 500 features, or at least 1000 features.

4. The method of claim 1, wherein selectively dropping or transforming one or more valid data points from the training complete dataset comprises:
    defining a first patient cohort in a target dataset;
    defining a second patient cohort in the training complete dataset;
    generating a first distribution from the first patient cohort in the target dataset;
    generating a second distribution from the second patient cohort in the training complete dataset at one of a patient level, a product level, or a pharmacy level;
    comparing the first distribution to the second distribution; and
    based on the comparison, selectively removing data points from the training complete dataset to align the second distribution of the training complete dataset with the first distribution of the target dataset.

5. The method of claim 4, wherein defining a first patient cohort or defining a second patient cohort comprises identifying subjects in the target dataset or the training complete dataset that meet one or more criteria comprising at least one of: one or more diagnoses within a first period of time; a provided therapy within a second period of time; a total time of enrollment; or one or more diagnoses within a first period of time and a provided therapy within a second period of time.

6. The method of claim 4, wherein the first distribution and the second distribution represent a number of claims per patient in the first patient cohort and the second patient cohort, respectively.

7. The method of claim 6, wherein selectively removing data points from the training complete dataset comprises removing one or more claims from one or more patients in the second patient cohort such that a percentage of patients in the target dataset with no claims aligns with a percentage of patients in the training complete dataset with no claims.

8. The method of claim 6, wherein the first distribution and the second distribution represent a number of claims for a healthcare event of interest per patient in the first patient cohort and the second patient cohort, respectively.

9. The method of claim 8, wherein selectively removing valid data points from the training complete dataset comprises removing one or more claims from one or more patients in the second patient cohort to generate a modified dataset such that the first distribution aligns with a modified second distribution of the modified dataset.

10. The method of claim 4, wherein the first distribution and the second distribution represent a number of claims across pharmacies.

11. The method of claim 10, wherein selectively removing valid data points from the training complete dataset comprises removing one or more claims from one or more patients in the second patient cohort to generate a modified second distribution of the second patient cohort.

12. The method of claim 11, wherein the valid data points are selectively removed from the training complete dataset such that a percentage of pharmacies of the first distribution with no claims aligns with a percentage of pharmacies of the modified second distribution with no claims.

13. The method of claim 11, wherein the valid data points are selectively removed from the training complete dataset such that the first distribution aligns with a modified second distribution of the second patient cohort.

14. The method of claim 1, wherein the training incomplete dataset is matched to the training complete dataset.

15. The method of claim 1, wherein features of the obtained first dataset comprise one or more of: a number of prior lines of therapies provided to the subject, an indication of whether one or more types of therapies were provided to the subject, enrollment data, a demographic, a diagnosis, a procedure, provider data, clinical utilization data, a prescription medication, an expenditure, and a timing of a medical event.

16. The method of claim 15, wherein one or more features shared between the training incomplete dataset and the obtained first dataset comprise one or more of procedures and prescription medications.

17. The method of claim 15, wherein the missing data of the first dataset comprises features of at least one of: a diagnosis, a procedure, provider data, a clinical utilization, a prescription drug claim, or an expenditure.

18. The method of claim 15, wherein the number of prior lines of therapies is at least one of the following: a threshold number of zero or more prior lines of therapy; a threshold number of one or more prior lines of therapy; a threshold number of two or more prior lines of therapy; a threshold number of three or more prior lines of therapy; or a threshold number of four or more prior lines of therapy.

19. The method of claim 1, wherein the training complete dataset comprises at least one data point for a feature of enrollment data that is not included in the training incomplete dataset.

20. The method of claim 1, wherein the first dataset and the second patient datasets are healthcare datasets including data for at least 10, at least 25, at least 50, at least 100, at least 500, at least 1000, at least 5000, at least 10,000, at least 25,000, at least 50,000, at least 100,000, at least 500,000, or at least 1,000,000 patients.

21. The method of claim 1, wherein the first dataset is obtained from at least one of a clearinghouse, a pharmacy, or a software platform other than a health insurance provider software platform.

22. The method of claim 1, wherein the second patient datasets comprise one of a closed dataset or a superset comprising data from an open dataset and a closed dataset.

23. The method of claim 1, wherein the second source comprises one or more health insurance providers.

24. The method of claim 1, wherein the training incomplete dataset is derived by pooling data from a plurality of closed datasets, or from a superset comprising data from an open dataset and a closed dataset.

25. The method of claim 1, wherein the outcome is an indication related to whether a patient is eligible for a CAR-T therapy or other therapy for relapsed/refractory multiple myeloma (RRMM).

26. The method of claim 1, wherein the ground truth label comprises an indication of whether a patient is eligible to receive one or more therapies.

27. A non-transitory computer readable medium comprising instructions that, when executed by a processor, cause the processor to perform one or more operations for:
obtaining or having obtained a first dataset comprising patient data for one or more patients, wherein the first dataset is obtained from a first source of patient datasets that are missing data in comparison to second patient datasets from a second source;
deriving a training incomplete dataset of patient data from a training complete dataset of patient data by applying one or more random selection algorithms to each data point across the training complete dataset to extract features from the training complete dataset corresponding to one or more features of the obtained first dataset, and selectively dropping or transforming one or more valid data points from the training complete dataset based on a statistical distribution constraint corresponding to values of the one or more valid data points to create a subset of valid data points, the derived training incomplete dataset having the extracted features corresponding to the one or more features of the obtained first dataset and the subset of valid data points, the subset of valid data points comprising fewer features or fewer data points than the training complete dataset;
identifying selected predictive features of patient data from the training incomplete dataset without the one or more valid data points dropped or transformed from the training complete dataset;
deriving a ground truth label comprising an outcome corresponding to the selected predictive features of the patient data;
creating an input training dataset comprising the selected features of the training incomplete patient dataset and the ground truth label;
training a machine learning model using the input training dataset;
applying the trained machine learning model to the obtained first dataset for at least one of the one or more patients to generate a calculated outcome indication; and
taking an action with respect to at least one of the one or more patients based at least on the calculated outcome indication.

28. A method of training a machine learning model, comprising:
obtaining or having obtained a first dataset comprising patient data for one or more patients, wherein the first dataset is obtained from a first source of patient datasets that are missing data in comparison to second patient datasets from a second source;
deriving a training incomplete dataset of patient data from a training complete dataset of patient data by applying one or more random selection algorithms to each data point across the training complete dataset to extract features from the training complete dataset corresponding to one or more features of the obtained first dataset, and selectively dropping or transforming one or more valid data points from a training complete dataset based on a statistical distribution constraint corresponding to values of the one or more valid data points to create a subset of valid data points, the derived training incomplete dataset having the extracted features corresponding to the one or more features of the obtained first dataset and the subset of valid data points, the subset of valid data points comprising fewer features or fewer data points than the training complete dataset;

identifying selected predictive features of patient data from the training incomplete dataset without the one or more valid data points dropped or transformed from the training complete dataset;

deriving a ground truth label from the training complete dataset, wherein the ground truth label comprises an outcome corresponding to the selected predictive features of the patient data;

creating an input training dataset comprising the training incomplete dataset and the ground truth label; and training the machine learning model using the input training dataset.

29. The method of claim 28, wherein deriving the training incomplete dataset comprises selectively dropping or transforming one or more valid data points from the training complete dataset until the statistical distribution constraint is reached.

30. A computer-implemented method comprising:

obtaining or having obtained a first dataset comprising patient data points of features for one or more patients, wherein the first dataset is obtained from a first source of patient datasets that are missing data points of features in comparison to second patient datasets from a second source, and wherein the features comprise one or more of the following: a type of therapy or prescription medication provided to the patient, enrollment data, a demographic, a diagnosis, a procedure, provider data, clinical utilization, an expenditure, or a timing of a previously listed medical event;

deriving a training incomplete dataset of patient data from a training complete dataset of patient data by applying one or more random selection algorithms that extract features from each data point across the training complete dataset corresponding to one or more features of the obtained first dataset, and selectively dropping or transforming, on a random basis, one or more valid data points of the extracted features from the training complete dataset based on a statistical distribution constraint for aligning values of the one or more valid data points with a multinomial or Poisson statistical distribution of data points of the first dataset to create a subset of valid data points, the derived training incomplete dataset having the extracted features corresponding to the one or more features of the obtained first dataset and the subset of valid data points, the subset of valid data points comprising fewer features or fewer data points of features than the training complete dataset;

identifying selected predictive features of patient data from the training incomplete dataset without the one or more valid data points dropped or transformed from the training complete dataset;

deriving a ground truth label comprising an outcome corresponding to the selected predictive features of the patient data;

creating an input training dataset comprising the selected features of the training incomplete patient dataset and the ground truth label;

training a machine learning model using the input training dataset to discriminate between whether a patient outcome is valid or invalid based on the selected features of the training incomplete patient dataset, wherein the machine learning model comprises at least one of the following: a regression model, a decision tree, a random forest, a support vector machine, a Naïve Bayes model, a k-means cluster, or a neural network;

applying the trained machine learning model to a test patient dataset comprising patient data points of features obtained from the first source to generate a calculated outcome indication; and taking an action with respect to at least one patient having data points in the test patient dataset based at least on the calculated outcome indication.

* * * * *